US012598608B2

(12) United States Patent
Zhang et al.

(10) Patent No.: US 12,598,608 B2
(45) Date of Patent: Apr. 7, 2026

(54) SYSTEMS AND METHODS OF PUSCH TRANSMISSION IN SINGLE DCI BASED MULTI-TRP OPERATION

(71) Applicant: ZTE CORPORATION, Shenzhen (CN)

(72) Inventors: Yang Zhang, Shenzhen (CN); Chuangxin Jiang, Shenzhen (CN); Zhaohua Lu, Shenzhen (CN); Hao Wu, Shenzhen (CN); Shujuan Zhang, Shenzhen (CN); Meng Mei, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 370 days.

(21) Appl. No.: 18/139,726

(22) Filed: Apr. 26, 2023

(65) Prior Publication Data

US 2023/0300833 A1      Sep. 21, 2023

Related U.S. Application Data

(63) Continuation of application No. PCT/CN2020/135569, filed on Dec. 11, 2020.

(51) Int. Cl.
*H04W 72/1268* (2023.01)
*H04W 52/10* (2009.01)
*H04W 72/23* (2023.01)

(52) U.S. Cl.
CPC ....... *H04W 72/1268* (2013.01); *H04W 52/10* (2013.01); *H04W 72/23* (2023.01)

(58) Field of Classification Search
CPC . H04W 72/1268; H04W 72/23; H04W 52/10; H04W 52/0146; H04L 5/0051; H04L 5/0094; H04L 5/0044

USPC ................................................. 370/329–330
See application file for complete search history.

(56) References Cited

U.S. PATENT DOCUMENTS

| | | | |
|---|---|---|---|
| 2020/0106645 A1 | 4/2020 | Tsai et al. | |
| 2020/0107353 A1* | 4/2020 | Jung | H04W 72/23 |
| 2021/0044385 A1* | 2/2021 | Hosseini | H04L 1/08 |
| 2021/0153137 A1* | 5/2021 | MolavianJazi | H04W 52/146 |
| 2023/0156616 A1* | 5/2023 | Yao | H04W 52/242 |
| | | | 370/329 |
| 2023/0180134 A1* | 6/2023 | Liu | H04W 52/242 |
| | | | 455/522 |

(Continued)

FOREIGN PATENT DOCUMENTS

| | | |
|---|---|---|
| CN | 110536394 A | 12/2019 |
| WO | WO-2020/093362 A1 | 5/2020 |

OTHER PUBLICATIONS

Extended European Search Report on EP Appln No. 20964716.3, dated Dec. 13, 2023 (9 pages).

(Continued)

*Primary Examiner* — Candal Elpenord
(74) *Attorney, Agent, or Firm* — Foley & Lardner LLP

(57) ABSTRACT

A wireless communication method includes receiving, by a wireless communication device, a scheduling grant that comprises a first indicator and a second indicator to schedule a plurality of uplink data transmission instances; and transmitting, by the wireless communication device, the plurality of uplink data transmission instances that correspond to at least one of a first resource set or a second resource set based on the first indicator and the second indicator.

15 Claims, 19 Drawing Sheets

(56) References Cited

U.S. PATENT DOCUMENTS

| | | | | |
|---|---|---|---|---|
| 2023/0189254 A1* | 6/2023 | Go | ............................ | H04B 7/06 |
| | | | | 370/329 |
| 2024/0015732 A1* | 1/2024 | Muruganathan | .. | H04W 72/1268 |
| 2024/0032025 A1* | 1/2024 | Gao | ..................... | H04W 72/232 |
| 2024/0032088 A1* | 1/2024 | Park | ..................... | H04B 7/0456 |

OTHER PUBLICATIONS

MCC Support, "Draft Report of 3GPP TSG RAN WGI #103-e v0.2.0 (Online meeting, Oct. 26-Nov. 13, 2020)", 3GPP TSG RAN WG1 Meeting #104-e, R1-210xxxx, e-Meeting, Nov. 3, 2020 (235 pages).

ERICSSON: "On PDCCH, PUCCH and PUSCH enhancements with multiple TRPs" 3GPP TSG-RAN WG1 Meeting #103; R1-2009223; Nov. 13, 2020; e-Meeting (27 pages).

International Search Report and Written Opinion for PCT Appl. No. PCT/CN2020/135569, mailed Sep. 10, 2021 (8 pages).

Nokia et al.: "Enhancements for Multi-TRP URLLC schemes" 3GPP TSG RAN WG1 #103 Meeting; R1-2008904; Nov. 13, 2020; e-Meeting (19 pages).

Asia Pacific Telecom, "Discussion on enhancements on multi-TRP for uplink channels", 3GPP TSG- RAN WG1 #103-e, R1-2009054, e-Meeting, Oct. 26, 2020 (4 pages).

CATT, "Discussion on enhancements on multi-TRP/panel for PDCCH, PUCCH AND PUSCH", 3GPP TSG RAN WG1 Meeting #103, R1-2007825, e-Meeting, Oct. 26, 2020 (15 pages).

Fraunhofer IIS, et al., "On multi-TRP enhancements for PDCCH and PUSCH", 3GPP TSG RAN WG1 Meeting #103-e, R1-2008898, e-Meeting, Oct. 26, 2020 (9 pages).

Futurewei, "Multi-TRP/panel for non-PDSCH", 3GPP TSG RAN WG1 #103-e, R1-2007540, e-Meeting, Oct. 26, 2020 (19 pages).

Lenovo et al., "Enhancements on Multi-TRP for PDCCH, PUCCH and PUSCH", 3GPP TSG RAN WG1 #103-e, R1-2008911, e-Meeting, Oct. 26, 2020 (15 pages).

Nokia et al., "Summary of Multi-TRP URLLC for PUCCH and PUSCH", 3GPP TSG RAN WG1 #103, R1-2009480, e-Meeting, Oct. 26, 2020 (70 pages).

NTT DOCOMO, Inc., "Discussion on MTRP for reliability", 3GPP TSG RAN WG1 #103-e, R1-2009175, e-Meeting, Oct. 26, 2020 (11 pages).

Oppo, "Enhancements on multi-TRP for PDCCH, PUCCH and PUSCH", 3GPP TSG RAN WG1 #103-e, R1-2008218, e-Meeting, Oct. 26, 2020 (9 pages).

Qualcomm Incorporated, "Enhancements on Multi-TRP for PDCCH, PUCCH and PUSCH", 3GPP TSG- RAN WG1 Meeting #103-e, R1-2009251, e-Meeting, Oct. 26, 2020 (33 pages).

Spreadtrum Communications, "Discussion on enhancements on Multi-TRP for PDCCH, PUCCH and PUSCH", 3GPP TSG RAN WG1 #103-e, R1-2009142, e-Meeting, Oct. 26, 2020 (13 pages).

Vivo, "Further discussion on enhancement of MTRP operation", 3GPP TSG RAN WG1 #103-e, R1-2007645, e-Meeting, Oct. 26, 2020 (15 pages).

Xiaomi, "Enhancements on Multi-TRP for PDCCH, PUCCH and PUSCH", 3GPP TSG RAN WG1 #103-e, R1-2009028, e-Meeting, Oct. 26, 2020 (18 pages).

ZTE, "Multi-TRP enhancements for PDCCH, PUCCH and PUSCH", 3GPP TSG RAN WG1 Meeting #103-e, R1-2007764, e-Meeting, (22 pages).

Office Action for VN Appl. No. 1-2023-02867, dated Sep. 11, 2025 (with English translation, 4 pages).

* cited by examiner

| Bit field mapped to index | SBRs's Nmax = 2 | Bit field mapped to index | SBRs's Nmax = 3 | Bit field mapped to index | SBRs's Nmax = 4 |
|---|---|---|---|---|---|
| 0 | 0 | 0 | 0 | 0 | 0 |
| 1 | 1 | 1 | 1 | 1 | 1 |
| 2 | 0,1 | 2 | 2 | 2 | 2 |
| 3 | reserved | 3 | 0,1 | 3 | 3 |
|  |  | 4 | 0,2 | 4 | 0,1 |
|  |  | 5 | 1,2 | 5 | 0,2 |
|  |  | 6 | 0,1,2 | 6 | 0,3 |
|  |  | 7 | reserved | 7 | 1,2 |
|  |  |  |  | 8 | 1,3 |
|  |  |  |  | 9 | 2,3 |
|  |  |  |  | 10 | 0,1,2 |
|  |  |  |  | 11 | 0,1,3 |
|  |  |  |  | 12 | 0,3,3 |
|  |  |  |  | 13 | 1,2,3 |
|  |  |  |  | 14 | 0,1,2,3 |
|  |  |  |  | 15 | reserved |

FIG. 2

| Bit field mapped to index | Rank 1 | Rank 2 | Rank 3 | Rank 4 |
|---|---|---|---|---|
| 0 | 0 | 0,1 | 0,1,2 | 0,1,2,3 |
| 1 | 1 | 0,2 | 0,1,3 | |
| 2 | 2 | 0,3 | 0,2,3 | |
| 3 | 3 | 1,2 | 1,2,3 | |
| 4 | | 1,3 | | |
| 5 | | 2,3 | | |
| 6 | | | | |
| 7 | | | | |

FIG. 3

| Bit field mapped to index | Rank 1 | Rank 2 | Rank 3 |
|---|---|---|---|
| 0 | 0 | 0,1 | 0,1,2 |
| 1 | 1 | 0,2 | |
| 2 | 2 | 1,2 | |
| 3 | | | |
| 4 | | | |
| 5 | | | |
| 6 | | | |
| 7 | | | |

FIG. 4

| Bit field mapped to index | Rank 1 | Rank 2 |
|---|---|---|
| 0 | 0 | 0,1 |
| 1 | 1 | |
| 2 | | |
| 3 | | |

FIG. 5

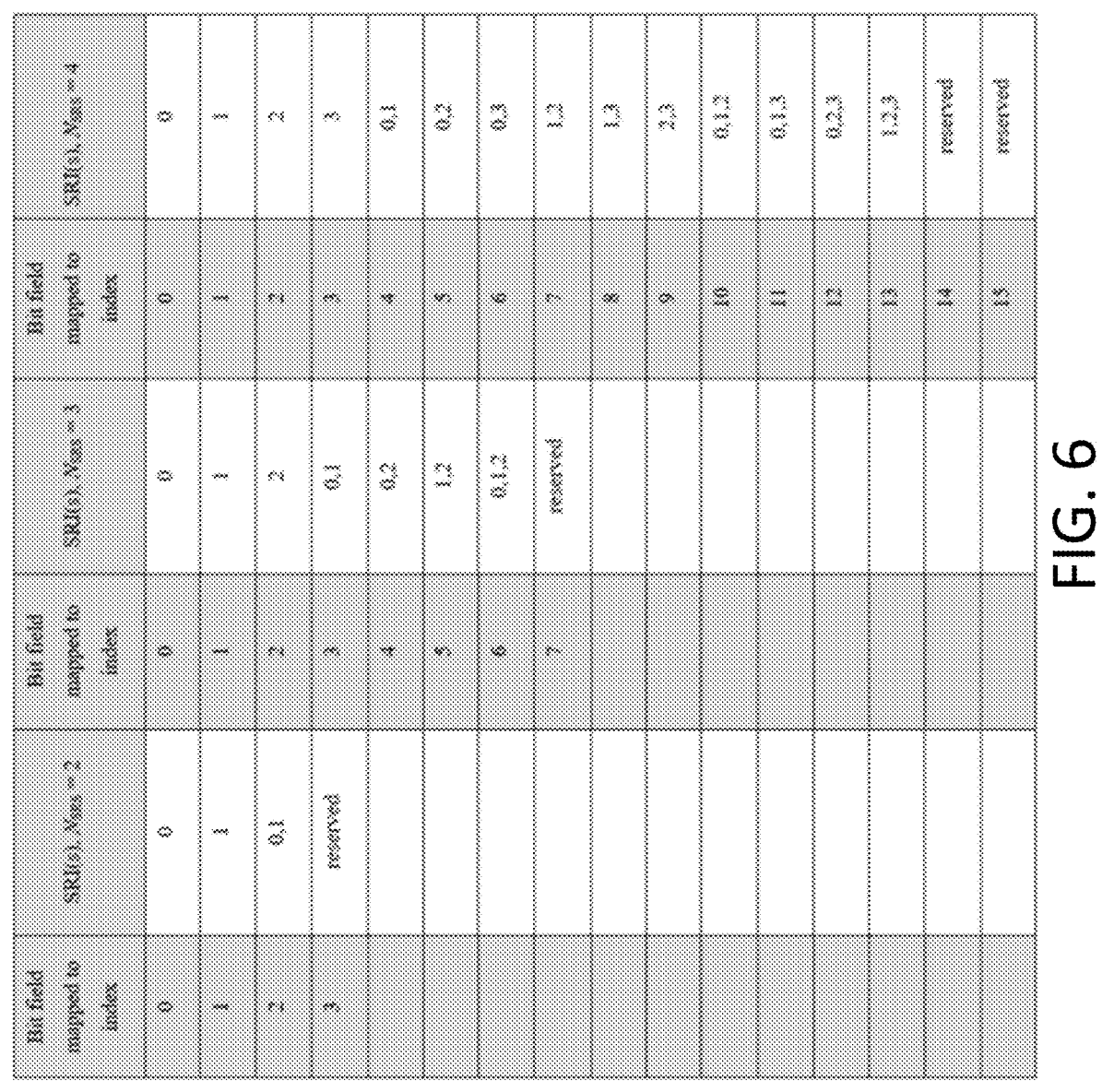

| Bit field mapped to index | $SRI(s), N_{max} = 2$ | Bit field mapped to index | $SRI(s), N_{max} = 3$ | Bit field mapped to index | $SRI(s), N_{max} = 4$ |
|---|---|---|---|---|---|
| 0 | 0 | 0 | 0 | 0 | 0 |
| 1 | 1 | 1 | 1 | 1 | 1 |
| 2 | 0,1 | 2 | 2 | 2 | 2 |
| 3 | reserved | 3 | 0,1 | 3 | 3 |
|   |   | 4 | 0,2 | 4 | 0,1 |
|   |   | 5 | 1,2 | 5 | 0,2 |
|   |   | 6 | 0,1,2 | 6 | 0,3 |
|   |   | 7 | reserved | 7 | 1,2 |
|   |   |   |   | 8 | 1,3 |
|   |   |   |   | 9 | 2,3 |
|   |   |   |   | 10 | 0,1,2 |
|   |   |   |   | 11 | 0,1,3 |
|   |   |   |   | 12 | 0,2,3 |
|   |   |   |   | 13 | 1,2,3 |
|   |   |   |   | 14 | reserved |
|   |   |   |   | 15 | reserved |

FIG. 6

| Bit field mapped to index | Rank 1 | Rank 2 | Rank 3 |
|---|---|---|---|
| 0 | 0 | 0,1 | 0,1,2 |
| 1 | 1 | 0,2 | 0,1,3 |
| 2 | 2 | 0,3 | 0,2,3 |
| 3 | 3 | 1,2 | 1,2,3 |
| 4 |   | 1,3 |   |
| 5 |   | 2,3 |   |
| 6 |   |   |   |
| 7 |   |   |   |

FIG. 7

| Bit field mapped to index | Rank 1 | Rank 2 | Rank 3 |
|---|---|---|---|
| 0 | 0 | 0,1 | 0,1,2 |
| 1 | 1 | 0,2 | |
| 2 | 2 | 1,2 | |
| 3 | | | |
| 4 | | | |
| 5 | | | |
| 6 | | | |
| 7 | | | |

FIG. 8

| Bit field mapped to index | Rank 1 | Rank 2 |
|---|---|---|
| 0 | 0 | 0,1 |
| 1 | 1 | |
| 2 | | |
| 3 | | |

FIG. 9

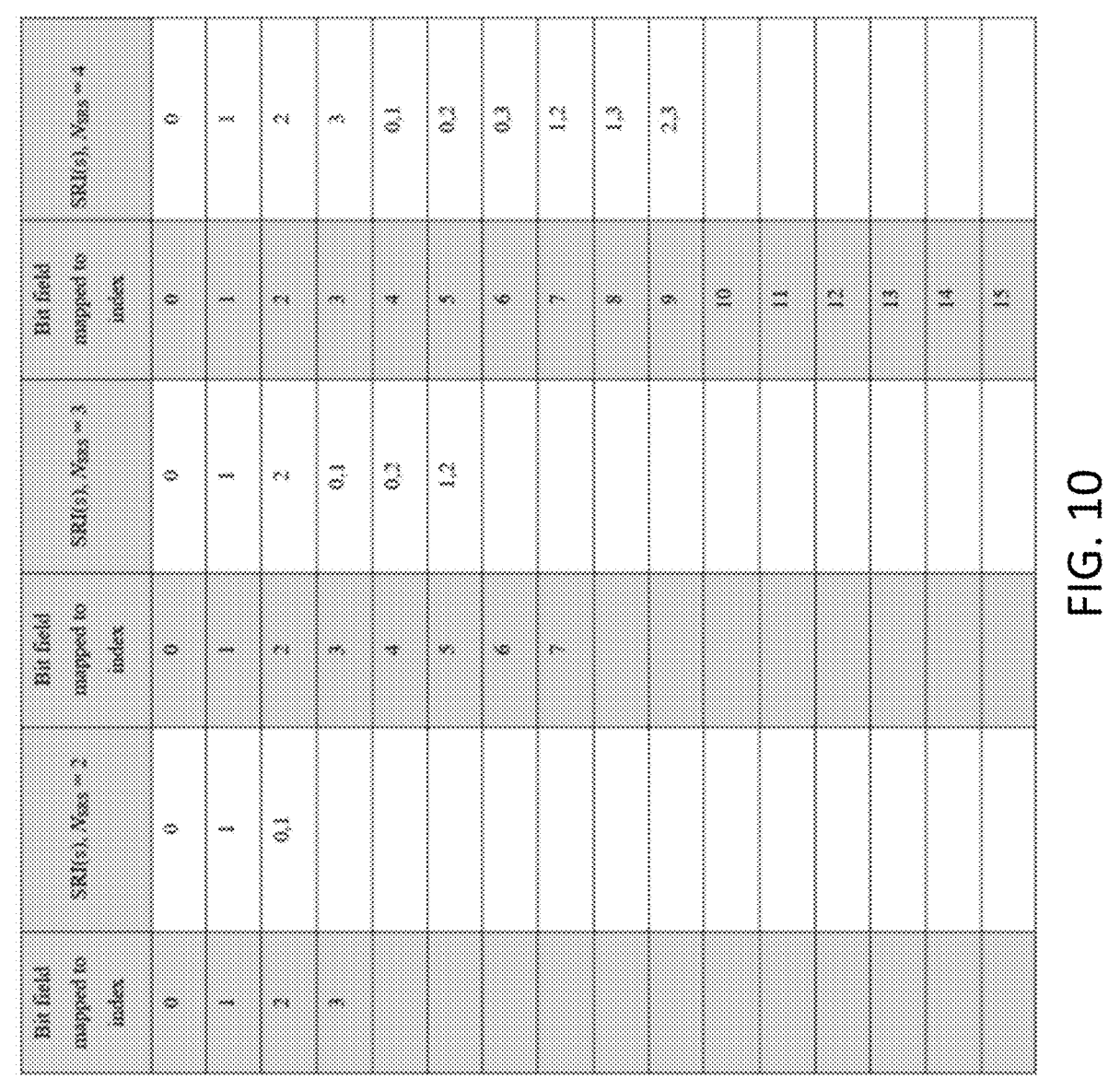

| Bit field mapped to index | SRI03,Nmax = 2 | Bit field mapped to index | SRI03,Nmax = 3 | Bit field mapped to index | SRI03,Nmax = 4 |
|---|---|---|---|---|---|
| 0 | 0 | 0 | 0 | 0 | 0 |
| 1 | 1 | 1 | 1 | 1 | 1 |
| 2 | 0,1 | 2 | 2 | 2 | 2 |
| 3 | | 3 | 0,1 | 3 | 3 |
| | | 4 | 0,2 | 4 | 0,1 |
| | | 5 | 1,2 | 5 | 0,2 |
| | | 6 | | 6 | 0,3 |
| | | 7 | | 7 | 1,2 |
| | | 8 | | 8 | 1,3 |
| | | 9 | | 9 | 2,3 |
| | | 10 | | | |
| | | 11 | | | |
| | | 12 | | | |
| | | 13 | | | |
| | | 14 | | | |
| | | 15 | | | |

FIG. 10

| Bit field mapped to index | Rank 1 | Rank 2 |
|---|---|---|
| 0 | 0 | 01 |
| 1 | 1 | 02 |
| 2 | 2 | 03 |
| 3 | 3 | 12 |
| 4 | | 13 |
| 5 | | 23 |
| 6 | | |
| 7 | | |

FIG. 11

| Bit field mapped to index | Rank 1 | Rank 2 |
|---|---|---|
| 0 | 0 | 0,1 |
| 1 | 1 | 0,2 |
| 2 | 2 | 1,2 |
| 3 | | |
| 4 | | |
| 5 | | |
| 6 | | |
| 7 | | |

FIG. 12

| Bit field mapped to index | Rank 1 | Rank 2 |
|---|---|---|
| 0 | 0 | 0 |
| 1 | 1 | |
| 2 | | |
| 3 | | |

FIG. 13

| Bit field mapped to index | SRI(s), Nss = 2 | Bit field mapped to index | SRI(s), Nss = 3 | Bit field mapped to index | SRI(s), Nss = 4 |
|---|---|---|---|---|---|
| 0 | 0 | 0 | 0 | 0 | 0 |
| 1 | 1 | 1 | 1 | 1 | 1 |
| 2 | | 2 | 2 | 2 | 2 |
| 3 | | 3 | | 3 | 3 |

FIG. 14

| Bit field mapped to index | Rank 1 |
|:---:|:---:|
| 0 | 0 |
| 1 | 1 |
| 2 | 2 |
| 3 | 3 |
| 4 | |
| 5 | |
| 6 | |
| 7 | |

FIG. 15

| Bit field mapped to index | Rank 1 |
|---|---|
| 0 | 0 |
| 1 | 1 |
| 2 | 2 |
| 3 | |
| 4 | |
| 5 | |
| 6 | |
| 7 | |

FIG. 16

| Bit field mapped to index | Rank 1 | Rank 2 |
|---|---|---|
| 0 | 0 | 0,1 |
| 1 | 1 | |
| 2 | | |
| 3 | | |

FIG. 17

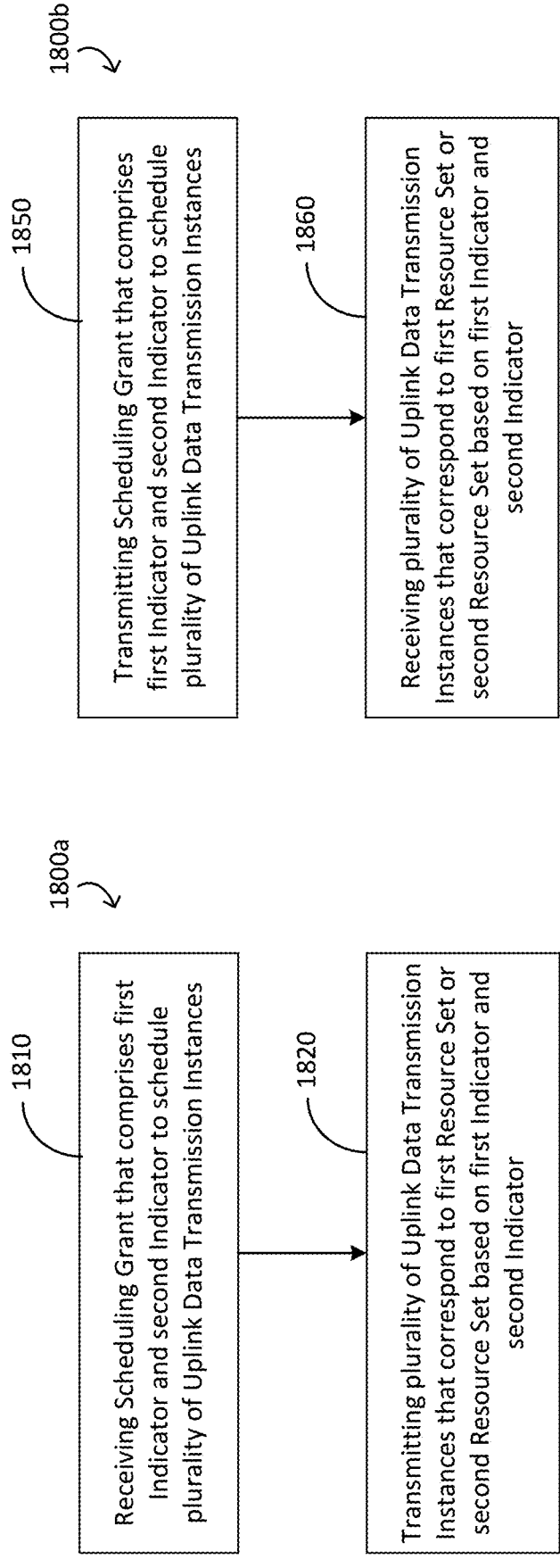

1800b

1850 — Transmitting Scheduling Grant that comprises first Indicator and second Indicator to schedule plurality of Uplink Data Transmission Instances 1860 — Receiving plurality of Uplink Data Transmission Instances that correspond to first Resource Set or second Resource Set based on first Indicator and second Indicator

1810 — Receiving Scheduling Grant that comprises first Indicator and second Indicator to schedule plurality of Uplink Data Transmission Instances 1820 — Transmitting plurality of Uplink Data Transmission Instances that correspond to first Resource Set or second Resource Set based on first Indicator and second Indicator

FIG. 18A

SYSTEMS AND METHODS OF PUSCH TRANSMISSION IN SINGLE DCI BASED MULTI-TRP OPERATION

CROSS-REFERENCE TO RELATED APPLICATION

This application claims the benefit of priority under 35 U.S.C. § 120 as a continuation of International Patent Application No. PCT/CN2020/135569, filed on Dec. 11, 2020, the disclosure of which is incorporated herein by reference in its entirety.

TECHNICAL FIELD

The disclosure relates generally to wireless communications and, more particularly, to systems and methods for PUSCH transmission using multi-TRP based on a single DCI.

BACKGROUND

In current 5G NR, Physical Uplink Shared Channel (PUSCH) repetition is only supported based on a single Transmit Receive Point (TRP), which will be a bottleneck for system reliability when multi-TRP based Physical Downlink Shared Channel (PDSCH) repetition is adopted. Especially in FR2, when a link between a User Equipment (UE) and a TRP is affected by blockage, the PUSCH repetition based on single-TRP would not be reliable any-more. In order to enhance the robustness and reliability for PUSCH transmission, single DCI based multi-TRP PUSCH repetition was supported recently For multi-TRP operation, due to different channel conditions of links between UE and multiple TRPs, some indicated information should be independent or unique for each TRP (e.g., spatial relation, precoder, power control, etc.). Similarly, some parameters in Downlink Control Information (DCI) filed (e.g., Sounding Reference Signal (SRS) Resource Indicator (SRI), Transmit Precoder Matrix Indicator (TPMI), Transmit Power Control (TPC) command, oper-loop parameter set, etc.) should be indicated for each TRP in order to improve performance. As such, it would be beneficial to indicate two indicated information instead of one.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In some arrangements, User Equipment (UE) performs a method including receiving a scheduling grant that comprises a first indicator and a second indicator to schedule a plurality of uplink data transmission instances; and transmitting the plurality of uplink data transmission instances that correspond to at least one of a first resource set or a second resource set based on the first indicator and the second indicator.

In other arrangements, BS performs a method including transmitting a scheduling grant that comprises a first indicator and a second indicator to schedule a plurality of uplink data transmission instances; and receiving, the plurality of uplink data transmission instances that correspond to at least one of a first resource set or a second resource set based on the first indicator and the second indicator.

In other embodiments, a wireless communications apparatus comprising a processor and a memory, wherein the processor is configured to read code from the memory and implement a method including receiving a scheduling grant that comprises a first indicator and a second indicator to schedule a plurality of uplink data transmission instances; and transmitting the plurality of uplink data transmission instances that correspond to at least one of a first resource set or a second resource set based on the first indicator and the second indicator.

In other embodiments, a computer program product comprising a computer-readable program medium code stored thereupon, the code, when executed by a processor, causing the processor to implement a method including receiving a scheduling grant that comprises a first indicator and a second indicator to schedule a plurality of uplink data transmission instances; and transmitting the plurality of uplink data transmission instances that correspond to at least one of a first resource set or a second resource set based on the first indicator and the second indicator.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 2 is a table illustrating the indication of a first SRI, according to various embodiments.

FIG. 3 is a table illustrating the indication of a second SRI, according to various embodiments.

FIG. 4 is a table illustrating the indication of a second SRI, according to various embodiments.

FIG. 5 is a table illustrating the indication of a second SRI, according to various embodiments.

FIG. 6 is a table illustrating the indication of a first SRI, according to various embodiments.

FIG. 7 is a table illustrating the indication of a second SRI, according to various embodiments.

FIG. 8 is a table illustrating the indication of a second SRI, according to various embodiments.

FIG. 9 is a table illustrating the indication of a second SRI, according to various embodiments.

FIG. 10 is a table illustrating the indication of a first SRI, according to various embodiments.

FIG. 11 is a table illustrating the indication of a second SRI, according to various embodiments.

FIG. 12 is a table illustrating the indication of a second SRI, according to various embodiments.

FIG. 13 is a table illustrating the indication of a second SRI, according to various embodiments.

FIG. 14 is a table illustrating the indication of a first SRI, according to various embodiments.

FIG. 15 is a table illustrating the indication of a second SRI, according to various embodiments.

FIG. 16 is a table illustrating the indication of a second SRI, according to various embodiments.

FIG. 17 is a table illustrating the indication of a second SRI, according to various embodiments.

FIG. 18A is a flowchart diagram illustrating an example wireless communication method for PUSCH transmission using multi-TRP with a single DCI, according to various embodiments.

FIG. 18B is a flowchart diagram illustrating another example wireless communication method for PUSCH transmission using multi-TRP with a single DCI, according to various embodiments.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1:
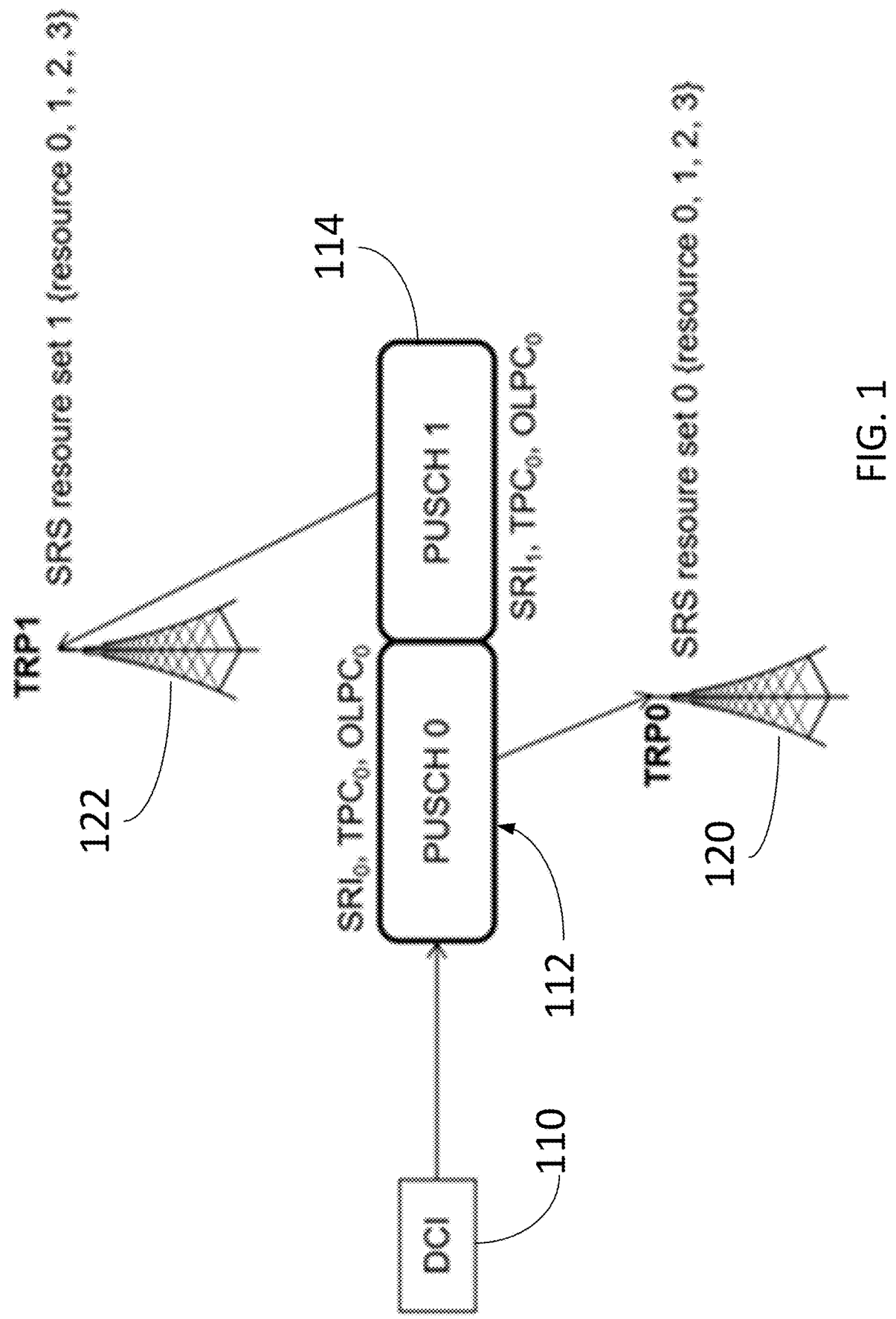
FIG. 1 is a diagram illustrating DCI based multi-TRP PUSCH transmission, according to various embodiments.

FIG. 1 is a diagram illustrating Downlink Control Information (DCI) based multi-Transmission and Reception Point (TRP) Physical Uplink Shared Channel (PUSCH) transmission. As shown in FIG. 1, a DCI 110 schedules a first PUSCH 112 in communication with a first TRP 120 as indicated by a first Sounding Reference Signal (SRS) resource set. The DCI 110 then schedules a second PUSCH 114 in communication with a second TRP 122 as indicated by a second SRS resource set. For multi-TRP operation, due to different channel conditions of links between User Equipment (UE) and multiple TRPs, some indicated information should be independent or unique for each TRP (e.g., spatial relation, precoder, power control, etc.). Similarly, some parameters in the DCI (e.g., DCI 110) filed (e.g., SRS Resource Index (SRI), Transmitted Precoding Matrix Indicator (TPMI), Transmitter Power Control (TPC) command, open-loop parameter set) should be indicated for each TRP (e.g., first TRP 120, second TRP 122) for better performance. Thus, it would be beneficial to indicate two indicated information on the DCI 110 instead of one. Further, in order to be able to dynamically switch between single-TRP and multi-TRP based transmission, it should be possible to indicate either one SRS resource set or two SRS resource sets in the DCI 110. Systems and methods herein discuss a new design for DCI that is required to indicate the different information to each TRP.

In Rel-15 and Rel-16 New Radio (NR), due to PUSCH transmission/repetition for single-TRP, the UE uses the same indicated information for the repeated transmission across multiple slots, meaning that each of these repeated transmissions uses at least the same spatial relation, precoder, and power control parameters. These principles are slightly different for codebook-based and non-codebook based schemes, both of which are supported since Rel-15. However, regarding power control from PUSCH transmission, for both schemes both TPC command and open-loop power control parameter set information can be provided by DCI to indicate power adjustment. For codebook-based PUSCH transmission, the UE determines SRI and TPMI information (via precoding information and number of layers) from the corresponding fields in DCI, with SRI providing the Uplink (UL) beam information and TPMI providing UL precoder information.

For non-codebook based PUSCH transmission, in contrast to the codebook-based scheme, the UE determines precoder and transmission rank based on the SRI when multiple SRS resources configured in a SRS resource set, with the SRI given by the SRS resource indicator in DCI. Specifically, the UE will use one or more SRS resources for SRS transmission with, in a SRS resource set, the maximum number of SRS resources that can be configured to the UE for simultaneous transmission in the same symbol and the maximum number of SRS resources are each UE capabilities. The SRS resources transmitted simultaneously occupy the same Resource Blocks (RBs). Only one SRS port for each SRS resource is configured, and only one SRS resource set can be configured with high layer parameter usage in SRS-ResourceSet set to 'nonCodebook.' The maximum number of SRS resources in one SRS resource set that can be configured for non-codebook based PUSCH transmission is 4. The indicated SRI in slot n is associated with the most recent transmission of SRS resource(s) identified by the SRI, with the SRS transmission being prior to the Physical Downlink Control Channel (PDCCH) carrying the SRI. After the SRS transmission, the UE can calculate the precoder used for the transmission of SRS based on a measurement of an associate Non-Zero Power (NZP) Channel State Information (CSI) Reference Signal (RS) resource. The UE selection of a precoder (and the number of layers) for each scheduled PUSCH may be modified by the network (NW) (in case multiple SRS resources are configured). The UE will then transmit PUSCH using the same antenna ports as the SRS port(s) in the SRS resource(s) indicated by SRI given by DCI.

In general, 5G NR includes a number of Multiple Input Multiple Output (MIMO) features that facilitate utilization of a large number of antenna elements at Base Station (BS) for both sub-6 GHz and over-6 GHz frequency bands. One such MIMO feature is support for multi-TRP operation. The key point of this functionality is to collaborate with multiple TRPs to transmit data to the UE in order to improve transmission performance. As NR is commercialized, various aspects that require further enhancements can be identified from real deployment scenarios. For PUSCH reliability enhancement based on multi-TRP operation, the scheme of single DCI based multi-TRP PUSCH transmission has a stable design framework and will be studied first in Rel-17 NR. Based on that, up to two SRS resource sets can be configured with higher layer parameter usage in SRS-ResourceSet set to 'nonCodebook'. As follows, two SRIs in one DCI filed can be used for SRS resource indication of the two non-codebook based SRS resource sets respectively, and the transmission rank and the number of SRS port(s) are same for each non-codebook based PUSCH transmission.

In some first embodiments, the UE can be scheduled by NW to transmit multiple non-codebook based PUSCH transmissions, with each of the transmission rank and the corresponding SRS ports of all non-codebook based PUSCH transmissions being the same. Moreover, the UE can be configured with up to two SRS resource sets that are configured with higher layer parameter usage in SRS-ResourceSet to 'nonCodebook'. The UE can determine the UE's PUSCH precoder and transmission rank based on two SRI indications given in a scheduling grant, wherein the scheduling grant can be received with at least one of a DCI format, a configured grant, or a dynamically configured grant.

In some of these first embodiments, when all of the PUSCH transmissions are associated with the two non-codebook based SRS resource sets defined above, the difference between the two sets can be distinguished according to at least one of the following: 1) the first PUSCH set is associated with the one SRS resource set with the usage of non-codebook based transmission and the second PUSCH set is associated with another SRS resource set with the usage of non-codebook based transmission; 2) the first PUSCH transmission set corresponds to the first transmission occasion, and the second PUSCH transmission set corresponds to the second transmission occasion; 3) the first PUSCH transmission set corresponds to the first frequency hop and the second PUSCH transmission set corresponds to the second frequency hop; 4) the first PUSCH transmission set includes the first half of all PUSCH transmissions, and the second PUSCH transmission set includes the second half of all PUSCH transmissions; 5) the first PUSCH transmission set includes all PUSCH transmissions with odd order, and the second PUSCH transmission set includes all PUSCH transmissions with even order; and 6) the first PUSCH transmission set includes the first and second PUSCH transmissions, the second PUSCH transmission set includes the third and fourth PUSCH transmissions, and the first PUSCH transmission set includes the fifth and sixth PUSCH transmissions, and so on until the last PUSCH transmission.

In some of these first embodiments, the first SRI indication is associated with the first PUSCH transmission set and the second SRI indication is associated with the second PUSCH transmission set. Meanwhile, the first SRI indication corresponds to the first non-codebook based SRS resource set, and the second SRI indication corresponds to the second non-codebook based SRS resource set. Furthermore, the first TPC command and/or the first open-loop power control parameter set is then used for the first PUSCH transmission set, and the second TPC command and/or the first open-loop power control parameter set is then used for the second PUSCH transmission set.

In other of these first embodiments, when all of the PUSCH transmissions are associated with only one out of the two non-codebook based SRS resource sets, the first SRI indication is used to indicate the precoder and transmission rank of the PUSCH transmission, and the second SRI indication is used to indicate which SRS resource set will be associated with the PUSCH transmissions. Furthermore, the second SRI indication is also used to indicate which TPC and/or which open-loop power control parameter will be used for the PUSCH transmissions.

The indication of the first SRI is related to the number of maximum PUSCH transmission rank (denoted by $L_{max}$) and the number of configured SRS resources in the SRS resource set associated with the non-codebook based PUSCH transmission (denoted by $N_{SRS}$). FIG. 2 is a table illustrating the indication of the first SRI for values of $L_{max}=4$ and $N_{SRS}=\{2, 3, 4\}$. As shown in FIG. 2, in one example, when $N_{SRS}=4$ and SRI index=0, the UE will use the same antenna ports as the SRS ports in the SRS resources with index $\{0\}$ to transmit the PUSCH(s) belonging to the first PUSCH transmissions set, and the transmission rank is 1. In another example, when $N_{SRS}=4$ and SRI index=4, the UE will use the same antenna ports as the SRS ports in the SRS resources with index $\{0, 1\}$ to transmit the PUSCH(s) belonging to the first PUSCH transmissions set, and the transmission rank is 2. In yet another example, when $N_{SRS}=4$ and SRI index=10, the UE will use the same antenna ports as the SRS ports in the SRS resources with index $\{0, 1, 2\}$ to transmit the PUSCH(s) belonging to the first PUSCH transmissions set, and the transmission rank is 3. In a further example, when $N_{SRS}=4$ and SRI index=14, the UE will use the same antenna ports as the SRS ports in the SRS resources with index $\{0, 1, 2, 3\}$ to transmit the PUSCH(s) belonging to the first PUSCH transmissions set, and the transmission rank is 4.

The indication of the second SRI is related to the number of maximum PUSCH transmission rank (denoted by $L_{max}$), and the number of configured SRS resources in the SRS resource set associated with the non-codebook based PUSCH transmission (denoted by $N_{SRS}$) is also related to the indication of the first SRI in the same scheduling grant. Specifically, when the indication of the first SRI is determined, each of the number of SRS resources and the transmission rank of the second SRI will be the same as with the first SRI.

FIG. 3 is a table illustrating the second SRI indication for values of $L_{max}=4$ and $N_{SRS}=4$. When all of the PUSCH transmissions are associated with two non-codebook based SRS resource sets respectively, the second SRI indications of 0 to 5 are used for the PUSCH transmissions associated with the second resource set. When $N_{SRS}=4$ and the first SRI indication is any one of 0 to 3 (referring to FIG. 2), the transmission rank is 1. As shown in FIG. 3 then based on that, in one example, when the second SRI indication is 0, the UE will use the same antenna ports as the SRS ports in the SRS resources with index $\{0\}$ to transmit the PUSCH(s) belonging to the second PUSCH transmission set. In another example, when the second SRI indication is 1, the UE will use the same antenna ports as the SRS ports in the SRS resources with index $\{1\}$ to transmit the PUSCH(s) belonging to the second PUSCH transmissions set. In yet another example, when the second SRI indication is 2, the UE will use the same antenna ports as the SRS ports in the SRS resources with index $\{2\}$ to transmit the PUSCH(s) belonging to the second PUSCH transmissions set. In a further example, when the second SRI indication is 3, the UE will use the same antenna ports as the SRS orts in the SRS resources with index $\{3\}$ to transmit the PUSCH(s) belonging to the second PUSCH transmissions set.

Referring still to FIG. 3, when $N_{SRS}=4$ and the first SRI indication is any one of 4 to 9 (referring to FIG. 2), the transmission rank is 2. Based on that from FIG. 3, in one example, when the second SRI indication is 0, the UE will use the same antenna ports as the SRS ports in the SRS resources with index $\{0, 1\}$ to transmit the PUSCH(s)

belonging to the second PUSCH transmissions set. In another example, when the second SRI indication is 2, the UE will use the same antenna ports as the SRS ports in the SRS resources with index {0, 3} to transmit the PUSCH(s) belonging to the second PUSCH transmissions set. In another example, when the second SRI indication is 1, the UE will use the same antenna ports as the SRS ports in the SRS resources with index {0, 2} to transmit the PUSCH(s) belonging to the second PUSCH transmissions set. In yet another example, when the second SRI indication is 3, the UE will use the same antenna ports as the SRS ports in the SRS resources with index {1, 2} to transmit the PUSCH(s) belonging to the second PUSCH transmissions set. In a further example, when the second SRI indication is 4, the UE will use the same antenna ports as the SRS ports in the SRS resources with index {1, 3} to transmit the PUSCH(s) belonging to the second PUSCH transmissions set. In another further example, when the second SRI indication is 5, the UE will use the same antenna ports as the SRS ports in the SRS resources with index {2, 3} to transmit the PUSCH(s) belonging to the second PUSCH transmissions set.

Referring still to FIG. 3, when $N_{SRS}$=4 and the first SRI indication is any one of 10 to 13 (referring to FIG. 2), the transmission rank is 3. Based on that from FIG. 3, in one example, when the second SRI indication is 0, the UE will use the same antenna ports as the SRS ports in the SRS resources with index {0, 1, 2} to transmit the PUSCH(s) belonging to the second PUSCH transmissions set. In another example, when the second SRI indication is 1, the UE will use the same antenna ports as the SRS ports in the SRS resources with index {0, 1, 3} to transmit the PUSCH(s) belonging to the second PUSCH transmissions set. In yet another example, when the second SRI indication is 2, the UE will use the same antenna ports as the SRS ports in the SRS resources with index {0, 2, 3} to transmit the PUSCH(s) belonging to the second PUSCH transmissions set. In a further example, when the second SRI indication is 3, the UE will use the same antenna ports as the SRS ports in the SRS resources with index {1, 2, 3} to transmit the PUSCH(s) belonging to the second PUSCH transmission set.

Referring still to FIG. 3, when $N_{SRS}$=4 and the first SRI indication is 14 (referring to FIG. 2), the transmission rank is 4. Based on that from FIG. 3, when the second SRI indication is 0, the UE will use the same antenna ports as the SRS ports in the SRS resources with index {0, 1, 2, 3} to transmit the PUSCH(s) belonging to the second PUSCH transmissions set.

In yet other of these first embodiments, when all of the PUSCH transmissions are associated to only one of the two non-codebook based SRS resource sets, the two second SRI indications 6 and 7 are used to indicate which of the two non-codebook based SRS resource sets is selected. For example, when the second SRI indication is 6, the first SRI indication will be used for the PUSCH transmissions associated with the first SRS resource est. When the second SRI indication is 7, the first SRI indication will be used for the PUSCH transmissions associated with the second SRS resource set.

FIG. 4 is a table illustrating the indication of the second SRI indication for $L_{max}$=4 and $N_{SRS}$=3. When all of the PUSCH transmissions are associated with two non-codebook based SRS resource sets, the second SRI indications of 0 to 2 are used for the PUSCH transmissions that are associated with the second SRS resource set. When $N_{SRS}$=3 and the first SRI indication is any one of 0 to 2 (referring to FIG. 2), the transmission rank is 1. Based on that from FIG.

4, in one example, when the second SRI indication is 0, the UE will use the same antenna ports as the SRS ports in the SRS resources with index {0} to transmit the PUSCH(s) belonging to the second PUSCH transmissions set. In another example, when the second SRI indication is 1, the UE will use the same antenna ports as the SRS ports in the SRS resources with index {1} to transmit the PUSCH(s) belonging to the second PUSCH transmissions set. In a further example, when the second SRI indication is 2, the UE will use the same antenna ports as the SRS ports in the SRS resources with index {2} to transmit the PUSCH(s) belonging to the second PUSCH transmissions set.

Referring still to FIG. 4, when $N_{SRS}$=3 and the first SRI indication is any one of 3 to 5 (referring to FIG. 2), the transmission rank is 2. Based on that from FIG. 4, in one example, when the second SRI indication is 0, the UE will use the same antenna ports as the SRS ports in the SRS resources with index {0, 1} to transmit the PUSCH(s) belonging to the second PUSCH transmissions set. In another example, when the second SRI indication is 1, the UE will use the same antenna ports as the SRS ports in the SRS resources with index {0, 2} to transmit the PUSCH(s) belonging to the second PUSCH transmissions set. In a further example, when the second SRI indication is 2, the UE will use the same antenna ports as the SRS ports in the SRS resources with index {1, 2} to transmit the PUSCH(s) belonging to the second PUSCH transmissions set.

Referring still to FIG. 4, when $N_{SRS}$=3 and the first SRI indication is 6 (referring to FIG. 2), the transmission rank is 3. Based on that from FIG. 4, when the second SRI indication is 0, the UE will use the same antenna ports as the SRS ports in the SRS resources with index {0, 1, 2} to transmit the PUSCH(s) belonging to the second PUSCH transmissions set.

When all of the PUSCH transmissions are associated to only one of the two non-codebook based SRS resource sets, two of the second SRI indications 3 to 7 are used to indicate which of the two SRS resource sets is selected. In one example, when the SRI indication is 3, the first SRI indication will be used for the PUSCH transmissions associated with the first SRS resource set. When the second SRI indication is 4, the first SRI indication will be used for the PUSCH transmissions associated with the second SRS resource set. In another example, when the second SRI indication is 6, the first SRI indication will be used for the PUSCH transmissions associated with the first SRS resource set. When the second SRI indication is 7, the first SRI indication will be used for the PUSCH transmissions associated with the second SRS resource set.

FIG. 5 is a table illustrating the indication of the second SRI for values of $L_{max}$=4 and $N_{SRS}$=2. When all of the PUSCH transmissions are associated with two non-codebook based SRS resource sets, the second SRI indications of 0 and 1 are used for the PUSCH transmission that are associated with the second SRS set. When $N_{SRS}$=2 and the first SRI indication is any one of 0 to 1 (referring to Table 2), the transmission rank is 1. Based on that from FIG. 5, in one example, when the second SRI indication is 0, the UE will use the same antenna ports as the SRS ports in the SRS resources with index {0} to transmit the PUSCH(s) belonging to the second PUSCH transmissions set. In another example, when the second SRI indication is 1, the UE will use the same antenna ports as the SRS ports in the SRS resources with index {1} to transmit the PUSCH(s) belonging to the second PUSCH transmissions set.

When $N_{SRS}$=2 and the first SRI indication is 2 (referring to FIG. 2), the transmission rank is 2. Based on that from FIG. 5, in one example, when the second SRI indication is 0, the UE will use the same antenna ports as the SRS ports in the SRS resources with index $\{0, 1\}$ to transmit the PUSCH(s) belonging to the second PUSCH transmissions set.

When all of the PUSCH transmissions are associated to only one of the two non-codebook based SRS resource sets, the two second SRI indications 2 and 3 are used to indicate which of the two SRS resource sets is selected. For example, when the second SRI indication is 2, the first SRI indication will be used for the PUSCH transmissions associated with the first SRS resource set. When the second SRI indication is 3, the first SRI indication will be used for the PUSCH transmissions associated with the second SRS resource set.

FIG. 6 is a table illustrating the indication of the first SRI for values of $L_{max}$=3 and $N_{SRS}$=$\{2, 3, 4\}$. As shown in FIG. 6, in one example, when $N_{SRS}$=4 and the index value=0, the UE transmits the PUSCH transmission from the first PUSCH transmissions set using the same antenna ports as the SRS ports in the SRS resources with index $\{0\}$, and the transmission rank is 1. In another example, when $N_{SRS}$=4 and the index value=4, the UE transmits the PUSCH transmission from the first PUSCH transmissions set using the same antenna ports as the SRS ports in the SRS resources with index $\{0, 1\}$, and the transmission rank is 2. In yet another example, when $N_{SRS}$=4 and index value=10, the UE transmits the PUSCH transmission from the first PUSCH transmissions set using the same antenna ports as the SRS ports in the SRS resources with index $\{0, 1, 2\}$, and the transmission rank is 3.

FIG. 7 is a table illustrating the indication of the second SRI for values of $L_{max}$=3 and $N_{SRS}$=4. When all of the PUSCH transmissions are associated with two non-codebook based SRS resource sets respectively, the second SRI indications of 0 to 5 are used for the PUSCH transmissions that are associated with the second SRS resource set. When $N_{SRS}$=4 and the first SRI indication is any one of 0 to 3 (referring to FIG. 6), the transmission rank is 1. Based on that from FIG. 7, in one example, when the second SRI indication is 0, the UE will use the same antenna ports as the SRS ports in the SRS resources with index $\{0\}$ to transmit the PUSCH(s) belonging to the second PUSCH transmissions set. In another example, when the second SRI indication is 1, the UE will use the same antenna ports as the SRS ports in the SRS resources with index $\{1\}$ to transmit the PUSCH(s) belonging to the second PUSCH transmissions set. In yet another example, when the second SRI indication is 2, the UE will use the same antenna ports as the SRS ports in the SRS resources with index $\{2\}$ to transmit the PUSCH(s) belonging to the second PUSCH transmissions set. In a further example, when the second SRI indication is 3, the UE will use the same antenna ports as the SRS ports in the SRS resources with index $\{3\}$ to transmit the PUSCH(s) belonging to the second PUSCH transmissions set.

Referring still to FIG. 7, when $N_{SRS}$=4 and the first SRI indication is any one of 4 to 9 (referring to FIG. 6), the transmission rank is 2. Based on that from FIG. 7, in one example, when the second SRI indication is 0, the UE will use the same antenna ports as the SRS ports in the SRS resources with index $\{0, 1\}$ to transmit the PUSCH(s) belonging to the second PUSCH transmissions set. In another example, when the second SRI indication is 1, the UE will use the same antenna ports as the SRS ports in the SRS resources with index $\{0, 2\}$ to transmit the PUSCH(s) belonging to the second PUSCH transmissions set. In yet another example, when the second SRI indication is 2, the UE will use the same antenna ports as the SRS ports in the SRS resources with index $\{0, 3\}$ to transmit the PUSCH(s) belonging to the second PUSCH transmissions set. In a further example, when the second SRI indication is 3, the UE will use the same antenna ports as the SRS ports in the SRS resources with index $\{1, 2\}$ to transmit the PUSCH(s) belonging to the second PUSCH transmissions set. In another further example, when the second SRI indication is 4, the UE will use the same antenna ports as the SRS ports in the SRS resources with index $\{1, 3\}$ to transmit the PUSCH(s) belonging to the second PUSCH transmissions set. In yet another further example, when the second SRI indication is 5, the UE will use the same antenna ports as the SRS ports in the SRS resources with index $\{2, 3\}$ to transmit the PUSCH(s) belonging to the second PUSCH transmissions set.

Referring still to FIG. 7, when $N_{SRS}$=4 and the first SRI indication is any one of 10 to 13 (referring to FIG. 6), the transmission rank is 3. Based on that from FIG. 7, in one example, when the second SRI indication is 0, the UE will use the same antenna ports as the SRS ports in the SRS resources with index $\{0, 1, 2\}$ to transmit the PUSCH(s) belonging to the second PUSCH transmissions set. In another example, when the second SRI indication is 1, the UE will use the same antenna ports as the SRS ports in the SRS resources with index $\{0, 1, 3\}$ to transmit the PUSCH(s) belonging to the second PUSCH transmissions set. In yet another example, when the second SRI indication is 2, the UE will use the same antenna ports as the SRS ports in the SRS resources with index $\{0, 2, 3\}$ to transmit the PUSCH(s) belonging to the second PUSCH transmissions set. In a further example, when the second SRI indication is 3, the UE will use the same antenna ports as the SRS ports in the SRS resources with index $\{1, 2, 3\}$ to transmit the PUSCH(s) belonging to the second PUSCH transmissions set.

When all of the PUSCH transmissions are associated to only one of the two non-codebook based SRS resource sets, the two second SRI indications 6 and 7 are used to indicate which of the two SRS resource sets is selected. For example, when the second SRI indication is 6, the first SRI indication will be used for the PUSCH transmissions associated with the first SRS resource set. When the second SRI indication is 7, the first SRI indication will be used for the PUSCH transmissions associated with the second SRS resource set.

FIG. 8 is a table illustrating the indication of the second SRI for values of $L_{max}$=3 and $N_{SRS}$=3. When all of the PUSCH transmissions are associated with two non-codebook based SRS resource sets respectively, the second SRI indications of 0 to 2 are used for the PUSCH transmissions that are associated with the second SRS resource set. When $N_{SRS}$=3 and the first SRI indication is any one of 0 to 2 (referring to FIG. 6), the transmission rank is 1. Based on that from FIG. 8, in one example, when the SRI indication is 0, the UE will use the same antenna ports as the SRS ports in the SRS resources with index $\{0\}$ to transmit the PUSCH(s) belonging to the second PUSCH transmissions set. In another example, when the SRI indication is 1, the UE will use the same antenna ports as the SRS ports in the SRS resources with index $\{1\}$ to transmit the PUSCH(s) belonging to the second PUSCH transmissions set. In a further example, when the SRI indication is 2, the UE will use the same antenna ports as the SRS ports in the SRS resources with index $\{2\}$ to transmit the PUSCH(s) belonging to the second PUSCH transmissions set.

Referring still to FIG. 8, when $N_{SRS}$=3 and the first SRI indication is any one of 3 to 5 (referring to FIG. 6), the transmission rank is 2. Based on that from FIG. 8, in one example, when the second SRI indication is 0, the UE will use the same antenna ports as the SRS ports in the SRS resources with index {0, 1} to transmit the PUSCH(s) belonging to the second PUSCH transmissions set. In another example, when the second SRI indication is 1, the UE will use the same antenna ports as the SRS ports in the SRS resources with index {0, 2} to transmit the PUSCH(s) belonging to the second PUSCH transmissions set. In a further example, when the second SRI indication is 2, the UE will use the same antenna ports as the SRS ports in the SRS resources with index {1, 2} to transmit the PUSCH(s) belonging to the second PUSCH transmissions set.

Referring still to FIG. 8, when $N_{SRS}$=3 and the first SRI indication is 6 (referring to FIG. 6), the transmission is rank 3. Based on that from FIG. 8, when the second SRI indication is 0, the UE will use the same antenna ports as the SRS ports in the SRS resources with index {0, 1, 2} to transmit the PUSCH(s) belonging to the second PUSCH transmissions set.

When all of the PUSCH transmissions are associated to only one out of the two non-codebook based SRS resource sets, two of the second SRI indications of 3 to 7 are used to indicate which of the two SRS resource sets is selected. In one example, when the second SRI indication is 3, the first SRI indication will be used for the PUSCH transmissions associated with the first SRS resource set, and when the second SRI indication is 4, the first SRI indication will be used for the PUSCH transmissions associated with the second SRS resource set. In another example, when the second SRI indication is 6, the first SRI indication will be used for the PUSCH transmissions associated with the first SRS resource set, and when the second SRI indication is 7, the first SRI indication will be used for the PUSCH transmissions associated with the second SRS resource set.

FIG. 9 is a table illustrating the indication of the second SRI for values of $L_{max}$=3 and $N_{SRS}$=2. When all PUSCH transmissions are associated with two non-codebook based SRS resource sets, the second SRI indications of 0 and 1 are used for the PUSCH transmissions that are associated with the second SRS resource set. When $N_{SRS}$=2 and the first SRI indication is any one of 0 to 1 (referring to FIG. 6), the transmission rank is 1. Based on that from FIG. 9, in one example, when the second SRI indication is 0, the UE will use the same antenna ports as the SRS ports in the SRS resources with index {0} to transmit the PUSCH(s) belonging to the second PUSCH transmissions set. In another example, when the second SRI indication is 1, the UE will use the same antenna ports as the SRS ports in the SRS resources with index {1} to transmit the PUSCH(s) belonging to the second PUSCH transmissions set.

Referring still to FIG. 9, when $N_{SRS}$=2 and the first SRI indication is 2 (referring to FIG. 6), the transmission rank is 2. Based on that from FIG. 9, when the second SRI indication is 0, the UE will use the same antenna ports as the SRS ports in the SRS resources with index {0, 1} to transmit the PUSCH(s) belonging to the second PUSCH transmissions set.

When all of the PUSCH transmissions are associated to only one out of the two non-codebook based SRS resource sets, the two second SRI indications 2 and 3 are used to indicate which of the two SRS resource sets is selected. In one example, when the second SRI indication is 2, the first SRI indication will be used for the PUSCH transmissions associated with the first SRS resource set, and when the second SRI indication is 3, the first SRI indication will be used for the PUSCH transmissions associated with the second SRS resource set.

FIG. 10 is a table illustrating the indication of the first SRI for values of $L_{max}$=2 and $N_{SRS}$={2, 3, 4}. As shown in FIG. 10, in one example, when $N_{SRS}$=4 and the index value=0, the UE transmits the PUSCH transmission from the first PUSCH transmissions set using the same antenna ports as the SRS ports in the SRS resources with index {0}, and the transmission rank is 1. In another example, when $N_{SRS}$=4 and the index value=4, the UE transmits the PUSCH transmission from the first PUSCH transmissions set using the same antenna ports as the SRS ports in the SRS resources with index {0, 1}, and the transmission rank is 2.

FIG. 11 is a table illustrating the indication of the second SRI for values of $L_{max}$=2 and $N_{SRS}$=4. When all of the PUSCH transmissions are associated with two non-codebook based SRS resource sets respectively, the second SRI indications of 0 to 5 are used for the PUSCH transmissions that are associated with the second SRS resource set. As shown in FIG. 11, when $N_{SRS}$=4 and the first SRI indication is any one of 0 to 3 (referring to FIG. 10), the transmission rank is 1. Based on that from FIG. 11, in one example, when the second SRI indication is 0, the UE will use the same antenna ports as the SRS ports in the SRS resources with index {0} to transmit the PUSCH(s) belonging to the second PUSCH transmissions set. In another example, when the second SRI indication is 1, the UE will use the same antenna ports as the SRS ports in the SRS resources with index {1} to transmit the PUSCH(s) belonging to the second PUSCH transmissions set. In yet another example, when the second SRI indication is 2, the UE will use the same antenna ports as the SRS ports in the SRS resources with index {2} to transmit the PUSCH(s) belonging to the second PUSCH transmissions set. In a further example, when the second SRI indication is 3, the UE will use the same antenna ports as the SRS ports in the SRS resources with index {3} to transmit the PUSCH(s) belonging to the second PUSCH transmissions set.

Still referring to FIG. 11, when $N_{SRS}$=4 and the first SRI indication is any one of 4 to 9 (referring to FIG. 10), the transmission rank is 2. Based on that from FIG. 11, in one example, when the second SRI indication is 0, the UE will use the same antenna ports as the SRS ports in the SRS resources with index {0, 1} to transmit the PUSCH(s) belonging to the second PUSCH transmissions set. In another example, when the second SRI indication is 1, the UE will use the same antenna ports as the SRS ports in the SRS resources with index {0, 2} to transmit the PUSCH(s) belonging to the second PUSCH transmissions set. In yet another example, when the second SRI indication is 2, the UE will use the same antenna ports as the SRS ports in the SRS resources with index {0, 3} to transmit the PUSCH(s) belonging to the second PUSCH transmissions set. In a further example, when the second SRI indication is 3, the UE will use the same antenna ports as the SRS ports in the SRS resources with index {1, 2} to transmit the PUSCH(s) belonging to the second PUSCH transmissions set. In another further example, when the second SRI indication is 4, the UE will use the same antenna ports as the SRS ports in the SRS resources with index {1, 3} to transmit the PUSCH(s) belonging to the second PUSCH transmissions set. In yet another further example, when the second SRI indication is 5, the UE will use the same antenna ports as the SRS ports in the SRS resources with index {2, 3} to transmit the PUSCH(s) belonging to the second PUSCH transmissions set.

When all of the PUSCH transmissions are associated to only one of the two non-codebook based SRS resource sets, the two second SRI indications 6 and 7 are used to indicate which of the two SRS resource sets is selected. For example, when the second SRI indication is 6, the first SRI indication will be used for the PUSCH transmissions associated with the first SRS resource set, and when the second SRI indication is 7, the first SRI indication will be used for the PUSCH transmissions associated with the second SRS resource set.

FIG. 12 is a table illustrating the indication of the second SRI for values of $L_{max}=2$ and $N_{SRS}=3$. When all of the PUSCH transmissions are associated with two non-codebook based SRS resource sets, the second SRI indications of 0 and 2 are used for the PUSCH transmissions that are associated with the second SRS resource set. As shown in FIG. 12, when $N_{SRS}=3$ and the first SRI indication is any one of 0 to 2 (referring to FIG. 10), the transmission rank is 1. Based on that from FIG. 12, in one example, when the second SRI indication is 0, the UE will use the same antenna ports as the SRS ports in the SRS resources with index {0} to transmit the PUSCH(s) belonging to the second PUSCH transmissions set. In another example, when the second SRI indication is 1, the UE will use the same antenna ports as the SRS ports in the SRS resources with index {1} to transmit the PUSCH(s) belonging to the second PUSCH transmissions set. In yet another example, when the second SRI indication is 2, the UE will use the same antenna ports as the SRS ports in the SRS resources with index {2} to transmit the PUSCH(s) belonging to the second PUSCH transmissions set.

Referring still to FIG. 12, when $N_{SRS}=3$ and the first SRI indication any one of 3 to 5 (referring to FIG. 10), the transmission rank is 2. Based on that from FIG. 12, in one example, when the second SRI indication is 0, the UE will use the same antenna ports as the SRS ports in the SRS resources with index {0, 1} to transmit the PUSCH(s) belonging to the second PUSCH transmissions set. In another example, when the second SRI indication is 1, the UE will use the same antenna ports as the SRS ports in the SRS resources with index {0, 2} to transmit the PUSCH(s) belonging to the second PUSCH transmissions set. In a further example, when the second SRI indication is 2, the UE will use the same antenna ports as the SRS ports in the SRS resources with index {1, 2} to transmit the PUSCH(s) belonging to the second PUSCH transmissions set.

When all of the PUSCH transmissions are associated to only one out of two non-codebook based SRS resource sets, the two second SRI indications 3 to 7 are used to indicate which of the two SRS resource sets is selected. For example, when the second SRI indication is 3, the first SRI indication will be used for the PUSCH transmissions associated with the first SRS resource set, and when the second SRI indication is 4, the first SRI indication will be used for the PUSCH transmissions associated with the second SRS resource set. In another example, when the second SRI indication is 6, the first SRI indication will be used for the PUSCH transmissions associated with the first SRS resource set. When the second SRI indication is 7, the first SRI indication will be used for the PUSCH transmissions associated with the second SRS resource set.

FIG. 13 is a table illustrating the indication of the second SRI for values of $L_{max}=2$ and $N_{SRS}=2$. When all of the PUSCH transmissions are associated with two non-codebook based SRS resource sets respectively, the second SRI indications of 0 and 1 are used for the PUSCH transmissions that are associated with the second SRS resource set. As shown in FIG. 13, when $N_{SRS}=2$ and the first indication is anyone of 0 to 1 (referring to FIG. 10), the transmission is rank 1. Based on that from FIG. 13, in one example, when the second SRI indication is 0, the UE will use the same antenna ports as the SRS ports in the SRS resources with index {0} to transmit the PUSCH(s) belonging to the second PUSCH transmissions set. In another example, when the second SRI indication is 1, the UE will use the same antenna ports as the SRS ports in the SRS resources with index {1} to transmit the PUSCH(s) belonging to the second PUSCH transmissions set.

Referring still to FIG. 13, when $N_{SRS}=2$ and the first SRI indication is 2 (referring to Table 10), the transmission rank is 2. Based on that from FIG. 13, when the second SRI indication is 0, the UE will use the same antenna ports as the SRS ports in the SRS resources with index {0, 1} to transmit the PUSCH(s) belonging to the second PUSCH transmissions set.

When all of the PUSCH transmissions are associated to only one out of the two non-codebook based SRS resource sets, the two second SRI indications 2 and 3 are used to indicate which of the two SRS resource sets is selected. For example, when the second SRI indication is 2, the first SRI indication will be used for the PUSCH transmissions associated with the first SRS resource set, and when the second SRI indication is 3, the first SRI indication will be used for the PUSCH transmissions associated with the second SRS resource set.

FIG. 14 is a table illustrating the indication of the first SRI for values of $L_{max}=1$ and $N_{SRS}=\{2, 3, 4\}$. As shown in FIG. 14, when $N_{SRS}=4$ and the index value=0, the UE transmits the PUSCH transmission from the first PUSCH transmissions set using the same antenna ports as the SRS ports in the SRS resources with index {0}, and the transmission rank is 1.

FIG. 15 is a table illustrating the indication of the second SRI for values of $L_{max}=1$ and $N_{SRS}=\{4\}$. When all of the PUSCH transmissions are associated with two non-codebook based SRS resource sets respectively, the second SRI indications of 0 to 3 are used for the PUSCH transmissions that are associated with the second SRS resource set. As shown in FIG. 15, when $N_{SRS}=4$ and the first SRI indication is any one of 0 to 3 (referring to FIG. 14), the transmission rank is 1. Based on that from FIG. 15, in one example, when the second SRI indication is 0, the UE will use the same antenna ports as the SRS ports in the SRS resources with index {0} to transmit the PUSCH(s) belonging to the second PUSCH transmissions set. In another example, when the second SRI indication is 1, the UE will use the same antenna ports as the SRS ports in the SRS resources with index {1} to transmit the PUSCH(s) belonging to the second PUSCH transmissions set. In yet another example, when the second SRI indication is 2, the UE will use the same antenna ports as the SRS ports in the SRS resources with index {2} to transmit the PUSCH(s) belonging to the second PUSCH transmissions set. In a further example, when the second SRI indication is 3, the UE will use the same antenna ports as the SRS ports in the SRS resources with index {3} to transmit the PUSCH(s) belonging to the second PUSCH transmissions set.

When all of the PUSCH transmissions are associated to only one of the two non-codebook based SRS resource sets, two of the second SRI indications 4 to 7 are used to indicate which of the two SRS resource sets is selected. For example, when the second SRI indication is 4, the first SRI indication will be used for the PUSCH transmissions associated with the first SRS resource set, and when the second SRI indication is 5, the first SRI indication will be used for the PUSCH transmissions associated with the second SRS resource set. For another example, when the second SRI indication is 6, the first SRI indication will be used for the PUSCH transmissions associated with the first SRS resource set, and when the second SRI indication is 7, the first SRI indication will be used for the PUSCH transmissions associated with the second SRS resource set.

FIG. 16 is a table illustrating the indication of the second SRI for values of $L_{max}=1$ and $N_{SRS}=3$. When all of the PUSCH transmissions are associated with two non-codebook based SRS resource sets respectively, the second SRI indications of 0 to 2 are used for the PUSCH transmissions that are associated with the second SRS resource set. As shown in FIG. 16, when $N_{SRS}=3$ and the first SRI indication is any one of 0 to 2 (referring to FIG. 14), the transmission rank is 1. Based on that from FIG. 16, in one example, when the second SRI indication is 0, the UE will use the same antenna ports as the SRS ports in the SRS resources with index {0} to transmit the PUSCH(s) belonging to the second PUSCH transmissions set. In another example, when the second SRI indication is 1, the UE will use the same antenna ports as the SRS ports in the SRS resources with index {1} to transmit the PUSCH(s) belonging to the second PUSCH transmissions set. In a further example, when the second SRI indication is 2, the UE will use the same antenna ports as the SRS ports in the SRS resources with index {2} to transmit the PUSCH(s) belonging to the second PUSCH transmissions set.

When all of the PUSCH transmissions are associated to only one of the two non-codebook based SRS resource sets, two of the second SRI indications of 3 to 7 are used to indicate which of the two SRS resource sets is selected. For one example, when the second SRI indication is 3, the first SRI indication will be used for the PUSCH transmissions associated with the first SRS resource set, and when the second SRI indication is 4, the first SRI indication will be used for the PUSCH transmissions associated with the second SRS resource set. In another example, when the second SRI indication is 6, the first SRI indication will be used for the PUSCH transmissions associated with the first SRS resource set, and when the second SRI indication is 7, the first SRI indication will be used for the PUSCH transmissions associated with the second SRS resource set.

FIG. 17 is a table illustrating the indication of the second SRI for values $L_{max}=1$ and $N_{SRS}=2$. When all of the PUSCH transmissions are associated with two non-codebook based SRS resource sets respectively, the second SRI indications of 0 and 1 are used for the PUSCH transmissions that are associated with the second SRS resource set. As shown in FIG. 17, when $N_{SRS}=2$ with the first SRI indication being any one of 0 to 1 (referring to FIG. 14), the transmission rank is 1. Based on that from FIG. 17, in one example, when the second SRI indication is 0, the UE will use the same antenna ports as the SRS ports in the SRS resources with index {0} to transmit the PUSCH(s) belonging to the second PUSCH transmissions set. In another example, when the second SRI indication is 1, the UE will use the same antenna ports as the SRS ports in the SRS resources with index {1} to transmit the PUSCH(s) belonging to the second PUSCH transmissions set.

When all of the PUSCH transmissions are associated to only one of the two non-codebook based SRS resource sets, two of the second SRI indications 2 to 3 are used to indicate which of the two SRS resource sets is selected. For one example, when the second SRI indication is 2, the first SRI indication will be used for the PUSCH transmissions associated with the first SRS resource set, and when the second SRI indication is 3, the first SRI indication will be used for the PUSCH transmissions associated with the second SRS resource set.

In some second embodiments, the UE can be scheduled by NW to transmit multiple non-codebook based PUSCH transmissions, with the transmission rank and corresponding SRS ports of all non-codebook based PUSCH transmissions being the same. Moreover, the UE can be configured with up to two SRS resource sets that are configured with higher layer parameter usage in SRS-ResourceSet set to 'nonCodebook' or 'Codebook' simultaneously. The UE can determine the UE's PUSCH precoder and transmission rank based on up to two SRI indications, each of which are the same and given on a scheduling grant, wherein the scheduling grant can be received with at least one of a DCI format, a configured grant, or a dynamically configured grant. Both the first SRI indication and the second SRI indication are related to the maximum number of PUSCH transmission rank (denoted by $L_{max}$) and the number of configured SRS resources in the first SRS resource set associated with the non-codebook based PUSCH transmission (denoted by $N_{SRS}$). In one example, the first or second indications for the values of $L_{max}=4$ and $N_{SRS}=\{2, 3, 4\}$ is illustrated in FIG. 2. In another example, the first or second SRI indications for the values of $L_{max}=3$ and $N_{SRS}=\{2, 3, 4\}$ is illustrated in FIG. 6. In yet another example, the first or second SRI indications for the values of $L_{max}=2$ and $N_{SRS}=\{2, 3, 4\}$ is illustrated in FIG. 10. In a further example, the first or second SRI indications for the values of $L_{max}=1$ and $N_{SRS}=\{2, 3, 4\}$ is illustrated in FIG. 14.

When all of the PUSCH transmissions are associated with the two non-codebook based SRS resource sets and can be identified as two separate PUSCH sets, the difference between the two sets can be distinguished according to at least one of the following ways: 1) the first PUSCH set is associated with the one SRS resource set with the usage of non-codebook based transmission and the second PUSCH set is associated with another SRS resource set with the usage of non-codebook based transmission; 2) the first PUSCH transmission set corresponds to the first transmission occasion, and the second PUSCH transmission set corresponds to the second transmission occasion; 3) the first PUSCH transmission set corresponds to the first frequency hop and the second PUSCH transmission set corresponds to the second frequency hop; 4) the first PUSCH transmission set includes the first half of all PUSCH transmissions, and the second PUSCH transmission set includes the second half of all PUSCH transmissions; 5) the first PUSCH transmission set includes all PUSCH transmissions with odd order, and the second PUSCH transmission set includes all PUSCH transmissions with even order; and 6) the first PUSCH transmission set includes the first and second PUSCH transmissions, the second PUSCH transmission set includes the third and fourth PUSCH transmissions, and the first PUSCH transmission set includes the fifth and sixth PUSCH transmissions, and so on until the last PUSCH transmission.

In these second embodiments, the first SRI indication is associated with the first PUSCH transmission set and the second SRI indication is associated with the second PUSCH transmission set. Furthermore, the first SRI indication corresponds to the first non-codebook based SRS resource set, and the second SRI indication corresponds to the second non-codebook based SRS resource set. In addition, the first TPC command and/or the first open-loop power control parameter set will be used for the first PUSCH transmission set, and the second TPC command and/or the first open-loop power control parameter set will be used for the second PUSCH transmission set.

When all of the PUSCH transmissions are associated with only one of the two non-codebook based SRS resource sets, only one of the two SRI indications will be used to indicate the precoder and the transmission rank of the PUSCH transmission. Furthermore, the only one out of the two SRI indications also will be used to indicate which TPC command and/or which open-loop power control parameter set will be used for the PUSCH transmissions. Specifically, one specific entry in the first/second SRI indication filed is used to indicate that the first/second SRI is deactivated. Furthermore, the specific entry can be the last reserved entry or any of the reserved entries. In one example, for values of $L_{max}=4$ and $N_{SRS}=\{2, 3, 4\}$, when the first/second SRI indication is 15 in FIG. 2, the first/second SRI is deactivated. In another example, for values of $L_{max}=3$ and $N_{SRS}=\{2, 3, 4\}$, when the first/second SRI indication is 15 in FIG. 2, or when the first/second SRI indication is any one of 14 to 15 in FIG. 2, the first/second SRI is deactivated. In yet another example, for values of $L_{max}=2$ and $N_{SRS}=\{2, 3, 4\}$, when the first/second SRI indication is 15 in FIG. 10, or when the first/second SRI indication is any one of 10 to 15 in FIG. 2, the first/second SRI is deactivated. In a further example, for values of $L_{max}=1$ and $N_{SRS}=\{2, 3, 4\}$, when the first/second SRI indication is 7 in FIG. 14, or when the first/second SRI indication is any one of 4 to 7 in FIG. 2, the SRI is deactivated.

In some third embodiments, the UE can be scheduled by NW to transmit multiple non-codebook based PUSCH transmissions, in which the transmission rank and the corresponding SRS ports of all non-codebook based PUSCH transmissions are the same. Moreover, the UE can be configured with up to two SRS resource sets that are configured with higher layer parameter usage in SRS-ResourceSet to 'nonCodebook.' The UE can determine the UE's PUSCH precoder and transmission rank based on up to two SRI indications that are given in a scheduling grant, wherein the scheduling grant can be received with at least one of a DCI format, a configured grant, or a dynamically configured grant.

The indication of the first SRI is related to the maximum number of PUSCH transmission rank (denoted by $L_{max}$) and the number of configured SRS resources in the first SRS resource set associated with the non-codebook based PUSCH transmission (denoted by $N_{SRS}$). In one example, the first SRI indication for values of $L_{max}=4$ and $N_{SRS}=\{2, 3, 4\}$ is illustrated in FIG. 2 of the first embodiments. In another example, the first SRI indication for values of $L_{max}=3$ and $N_{SRS}=\{2, 3, 4\}$ is illustrated in FIG. 6 of the first embodiments. In yet another example, the first SRI indication for the values of $L_{max}=2$ and $N_{SRS}=\{2, 3, 4\}$ is illustrated in FIG. 10 of the first embodiments. In a further example, the first SRI indication for the values of $L_{max}=1$ and $N_{SRS}=\{2, 3, 4\}$ is illustrated in FIG. 14 of the first embodiments.

The indication of the second SRI is related to the maximum number of PUSCH transmission rank (denoted by $L_{max}$) and the number of configured SRS resources in the second SRS resource set associated with the non-codebook based PUSCH transmission (denoted by $N_{SRS}$). The indication is also related to the first SRI indication in the same scheduling grant. Specifically, when the first SRI indication is determined, both the number of SRS resources and the transmission rank of the second SRI will be the same as with the first SRI. For one example, the second SRI indication for values of $L_{max}=4$ and $N_{SRS}=\{2, 3, 4\}$ is illustrated in FIGS. 3-5 in the first embodiments. For another example, the second SRI indication for values of $L_{max}=3$ and $N_{SRS}=\{2, 3, 4\}$ is illustrated in FIGS. 7-9 in the first embodiments. For yet another example, the second SRI indication for values of $L_{max}=2$ and $N_{SRS}=\{2, 3, 4\}$ is illustrated in FIGS. 11-13 in the first embodiments. In a further example, the second SRI indication for values of $L_{max}=1$ and $N_{SRS}=\{2, 3, 4\}$ is illustrated in FIGS. 15-17 in the first embodiments.

In these third embodiments, when all of the PUSCH transmissions are associated with the above non-codebook based SRS resource sets respectively and can be identified as two PUSCH sets. The difference between the two sets can be distinguished by at least one of the following ways: 1) the first PUSCH set is associated with one SRS resource set based on the usage of non-codebook based transmission, and the second PUSCH set is associated with another SRS resource set based on the usage of non-codebook based transmission; 2) the first PUSCH transmission set corresponds to the first transmission occasion, and the second PUSCH transmission set corresponds to the second transmission occasion; 3) the first PUSCH transmission set corresponds to the first frequency hop, and the second PUSCH transmission set corresponds to the second frequency hop; 4) the first PUSCH transmission set includes the first half of all PUSCH transmissions, and the second PUSCH transmission set includes the second half of all PUSCH transmissions; 5) the first PUSCH transmission set includes all PUSCH transmissions with odd order, and the second PUSCH transmission set includes all PUSCH transmissions with even order; and 6) the first PUSCH transmission set includes the first and second PUSCH transmissions, the second PUSCH transmission set includes the third and fourth PUSCH transmissions, and the first PUSCH transmission set includes the fifth and sixth PUSCH transmissions, and so on until the last PUSCH transmission.

The first SRI indication is associated with the first PUSCH transmission set and the second SRI indication is associated with the second PUSCH transmission set. Furthermore, the first SRI indication corresponds to the first non-codebook based SRS resource set, and the second SRI indication corresponds to the second non-codebook based SRS resource set. In addition, the first TPC command and/or the first open-loop power control parameter set will be used for the first PUSCH transmission set, and the second TPC command and/or the second open-loop power control parameter set will be used for the second PUSCH transmission set.

When all of the PUSCH transmissions are associated with only one of the two non-codebook based SRS resource sets, only one of the two SRI indications will be used to indicate the precoder and transmission rank of the PUSCH transmission. Further, the only one of the two SRI indications also will be used to indicate which TPC command and/or which open-loop power control parameter set will be used for the PUSCH transmissions. Specifically, one specific entry in the first SRI indication filed is used to indicate that the first SRI is deactivated. This specific entry can be the last reserved entry, or this specific entry can be any of the reserved entries. For example, for values of $L_{max}=4$ and $N_{SRS}=\{2, 3, 4\}$, when the first SRI indication is 15 from FIG. 2, the first SRI is deactivated. For another example, for values of $L_{max}=3$ and $N_{SRS}=\{2, 3, 4\}$, when the first SRI indication is 15 in FIG. 6 or when the first SRI indication is any one of 14 to 15 in FIG. 2, the first SRI is deactivated. For yet another example, for values of $L_{max}=2$ and $N_{SRS}=\{2, 3, 4\}$, when the first SRI indication is 15 in FIG. 10 or when the first SRI indication is any one of 10 to 15 in FIG. 2, the first SRI is deactivated. For a further example, for values of $L_{max}$=1 and $N_{SRS}$={2, 3, 4}, when the first SRI indication is 7 in FIG. 14, or when the first SRI indication is any one of 4 to 7 in FIG. 2, the first SRI is deactivated.

Similarly, one specific entry in the second SRI indication filed is used to indicate that the second SRI is deactivated. This specific entry can be the last reserved entry, or can also be any one of the reserved entries. In one example, for the values of $L_{max}$=4 and $N_{SRS}$={4}, when the second SRI indication is 7 in FIG. 3, or when the second SRI indication is any one of 6 to 7 in FIG. 3, the second SRI is deactivated. In another example, for the values of $L_{max}$=4 and $N_{SRS}$={3}, when the second SRI indication is 3 in FIG. 4, the second SRI is deactivated. In yet another example, for the values of $L_{max}$=4 and $N_{SRS}$={2}, when the second SRI indication is 3 in FIG. 5, or when the second SRI indication is any one of 2 to 3 in FIG. 5, the second SRI is deactivated. In a further example, for the values of $L_{max}$=3 and $N_{SRS}$={4}, when the second SRI indication is 7 in FIG. 7, or when the second SRI indication is any one of 6 to 7 in FIG. 7, the second SRI is deactivated. In another further example, for the values of $L_{max}$=3 and $N_{SRS}$={3}, when the second SRI indication is 3 in FIG. 8, the second SRI is deactivated. In yet another further example, for the values of $L_{max}$=3 and $N_{SRS}$={2}, when the first SRI indication is 3 in FIG. 9, or when the second SRI indication is any one of 2 to 3 in FIG. 9, the second SRI is deactivated. In one example, for the values of $L_{max}$=2 and $N_{SRS}$={4}, when the second SRI indication is 7 in FIG. 11, or when the second SRI indication is any one out of 6 to 7 in FIG. 11, the second SRI is deactivated. In another example, for the values of $L_{max}$=2 and $N_{SRS}$={3}, when the second SRI indication is 3 in FIG. 12, the second SRI is deactivated. In yet another example, for values of $L_{max}$=2 and $N_{SRS}$={2}, when the second SRI indication is 3 in FIG. 13, or when the second SRI indication is any one of 2 to 3 in FIG. 13, the second SRI is deactivated. In a further example, for values of $L_{max}$=1 and $N_{SRS}$={4}, when the second SRI indication is 7 in FIG. 15, or when the second SRI indication is any one of 4 to 7 in FIG. 15, the second SRI is deactivated. In another further example, for values of $L_{max}$=1 and $N_{SRS}$={3}, when the second SRI indication is 3 in FIG. 16, the second SRI is deactivated. In yet another further example, for values of $L_{max}$=1 and $N_{SRS}$={2}, when the second SRI indication is 3 in FIG. 17, or when the second SRI indication is any one of 2 to 3 in FIG. 17, the second SRI is deactivated.

FIG. 18A is a flowchart diagram illustrating an example wireless communication method 1800a, according to various arrangements. Method 1800a can be performed by a UE, and begins at 1810 where the UE receives a scheduling grant that comprises a first SRI and a second SRI to schedule a plurality of uplink data transmission instances. The method 1800a proceeds to 1820, where the UE transmits the plurality of uplink data transmission instances that correspond to at least one of a first resource set or a second resource set based on the first SRI and the second SRI.

In some embodiments, each of the first and second resource sets includes a SRS resource set. In other embodiments, the scheduling grant can be received with at least one of a DCI format, a configured grant, or a dynamically configured grant. In still other embodiments, each of the uplink data transmission instances includes a non-codebook based PUSCH transmission. In further embodiments, plurality of uplink data transmission instances include a first uplink data transmission instance set and a second uplink data transmission instance set.

In other embodiments, the first and the second uplink data transmission instance sets respectively correspond to at least one of a first resource set and a second resource set, a first transmission occasion and a second transmission occasion of a same transport block, a first frequency hop and second frequency hop, a first half of a plurality of PUSCH transmissions and a second half of the plurality of PUSCH transmissions, a plurality of PUSCH transmissions arranged in an odd order and the plurality of PUSCH transmissions arranged in an even order, or odd pairs of a plurality of PUSCH transmissions and even pairs of the plurality of PUSCH transmissions.

In some first embodiments, the second SRI includes a first value indicating that the plurality of uplink data transmission instances correspond to at least one of the first resource set, a first TPC command, or a first open-loop power control parameter set. The second SRI also includes a second value indicating that the plurality of uplink data transmission instances correspond to at least one of the second resource set, a second TPC command, or a second open-loop power control parameter set. In some of these embodiments, the second SRI includes a third value indicating that a second set of the plurality of uplink data transmission instances correspond to at least one of the second resource set, the second TPC command, or the second open-loop power control parameter set.

In some of these first embodiments, the method 1800a further includes the UE determining that the second SRI is equal to the first value. The value of the first SRI indicates one or more resources in the first resource set for transmitting the plurality of uplink data transmission instances.

In some of these first embodiments, the method 1800a further includes the UE determining that the second SRI is equal to the second value. The value of the first SRI indicates one or more resources in the second resource set for transmitting the plurality of uplink data transmission instances.

In some of these first embodiments, the method 1800a further includes the UE determining that the second SRI is equal to the third value. The third value indicates one or more resources in the second resource set for transmitting the second set of the plurality of uplink data transmission instance. The UE then transmits a first set of the plurality of uplink data transmission instances corresponding to at least one of: the first resource set, the first TPC command, or the first open-loop power control parameter set. The value of the first SRI indicates one or more resources in the first resource set for transmitting the first set of the plurality of uplink data transmission instances.

In some of these first embodiments, the first value is a second greatest value of the second SRI, and the second value is a greatest value of the second SRI. In other of these first embodiments, the first value is a greatest value of the second SRI, and the second value is a second greatest value of the second SRI.

In some second embodiments, the first SRI includes a first value indicating that the plurality of uplink data transmission instances correspond to at least one of the second resource set, a second TPC command, or a second open-loop power control parameter set, and the second SRI includes a second value indicating that the plurality of uplink data transmission instances correspond to at least one of the first resource set, a first TPC command, or a first open-loop power control. The first or the second SRI include at least a third value indicating that a first set of the plurality of uplink data transmission instances correspond to at least one of the first resource set, the first TPC command, or the first open-loop power control parameter set, and a second set of the plurality of uplink data transmission instances correspond to at least one of the second resource set, the second TPC command, or the second open-loop power control parameter set.

In some of these second embodiments, the first value is a greatest value of the first SRI. In other of these second embodiments, the second value is a greatest value of the second SRI.

In any of these embodiments, the first SRI indicates at least one of a first resource set, a first TPC command, or a first open-loop power control parameter set, and the second SRI indicates at least one of a second resource set, a second TPC command, or a second open-loop power control parameter set.

FIG. 18B is a flowchart diagram illustrating an example wireless communication method 1800b, according to various arrangements. Method 1800b can be performed by a BS, and begins at 1850 where the BS transmits a scheduling grant that comprises a first SRI and a second SRI to schedule a plurality of uplink data transmission instances. The method 1800b proceeds to 1860 where the BS receives the plurality of uplink data transmission instances that correspond to at least one of a first resource set or a second resource set based on the first SRI and the second SRI.

In some embodiments, the first and second resource sets each include a SRS resource set. In other embodiments, the scheduling grant can be received with at least one of a DCI format, a configured grant, or a dynamically configured grant. In still other embodiments, each of the uplink data transmission instances includes a non-codebook based PUSCH transmission. In further embodiments, the plurality of uplink data transmission instances include a first uplink data transmission instance set and a second uplink data transmission instance set.

In other embodiments, the first and the second uplink data transmission instance sets respectively correspond to at least one of a first resource set and a second resource set, a first transmission occasion and a second transmission occasion of a same transport block, a first frequency hop and second frequency hop, a first half of a plurality of PUSCH transmissions and a second half of the plurality of PUSCH transmissions, a plurality of PUSCH transmissions arranged in an odd order and the plurality of PUSCH transmissions arranged in an even order, or odd pairs of a plurality of PUSCH transmissions and even pairs of the plurality of PUSCH transmissions.

In some first embodiments, the second SRI includes a first value indicating that the plurality of uplink data transmission instances correspond to at least one of the first resource set, a first TPC command, or a first open-loop power control parameter set. The second SRI also includes a second value indicating that the plurality of uplink data transmission instances correspond to at least one of the second resource set, a second TPC command, or a second open-loop power control parameter set. In some of these embodiments, the second SRI includes a third value indicating that a second set of the plurality of uplink data transmission instances correspond to at least one of the second resource set, the second TPC command, or the second open-loop power control parameter set.

In some of these first embodiments, the method 1800B further includes the BS, responsive to the second SRI being equal to the first value, receiving the plurality of uplink data transmission instances corresponding to at least one of the first resource set, the first TPC command, or the first open-loop power control parameter set. The value of the first SRI indicates one or more resources in the first resource set for transmitting the plurality of uplink data transmission instances.

In some of these first embodiments, the method 1800b further includes the BS, responsive to the second SRI being equal to the second value, receiving the plurality of uplink data transmission instances corresponding to at least one of the second resource set, the second TPC command, or the second open-loop power control parameter set. The value of the first SRI indicates one or more resources in the second resource set for transmitting the plurality of uplink data transmission instances.

In some of these first embodiments, the method 1800b further includes the BS, responsive to the second SRI being equal to the third value, receiving a first set of the plurality of uplink data transmission instances corresponding to at least one of: the first resource set, the first TPC command, or the first open-loop power control parameter set. The value of the first SRI indicates one or more resources in the first resource set for transmitting the first set of the plurality of uplink data transmission instances.

In some of these first embodiments, the first value is a second greatest value of the second SRI, and the second value is a greatest value of the second SRI. In other of these first embodiments, the first value is a greatest value of the second SRI, and the second value is a second greatest value of the second SRI.

In some second embodiments, the first SRI includes a first value indicating that the plurality of uplink data transmission instances correspond to at least one of the second resource set, a second TPC command, or a second open-loop power control parameter set, and the second SRI includes a second value indicating that the plurality of uplink data transmission instances correspond to at least one of the first resource set, a first TPC command, or a first open-loop power control. The first or the second SRI include at least a third value indicating that a first set of the plurality of uplink data transmission instances correspond to at least one of the first resource set, the first TPC command, or the first open-loop power control parameter set, and a second set of the plurality of uplink data transmission instances correspond to at least one of the second resource set, the second TPC command, or the second open-loop power control parameter set.

In some of these second embodiments, the first value is a greatest value of the first SRI. In other of these second embodiments, the second value is a greatest value of the second SRI.

In any of these embodiments, the first SRI indicates at least one of a first resource set, a first TPC command, or a first open-loop power control parameter set, and the second SRI indicates at least one of a second resource set, a second TPC command, or a second open-loop power control parameter set.

Figure 19B:
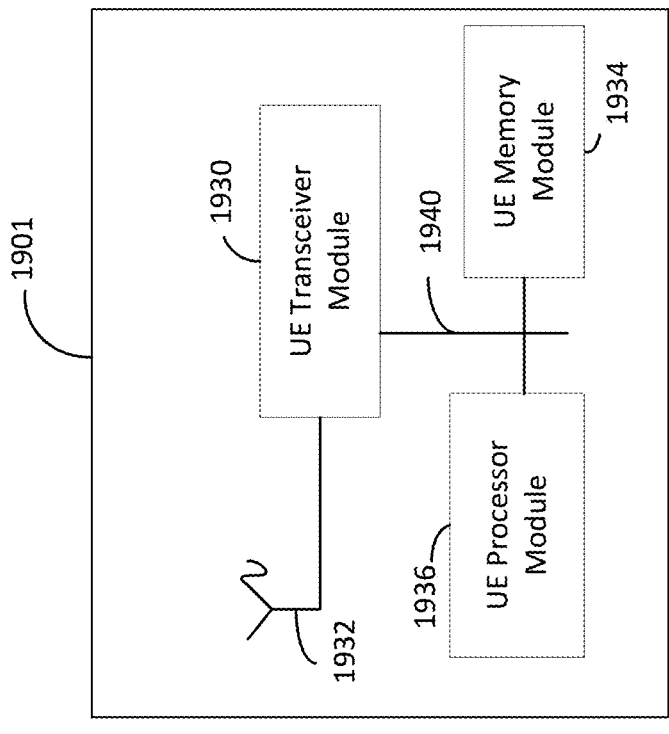
FIG. 19B illustrates a block diagram of an example user equipment, according to various embodiments.
Figure 19A:
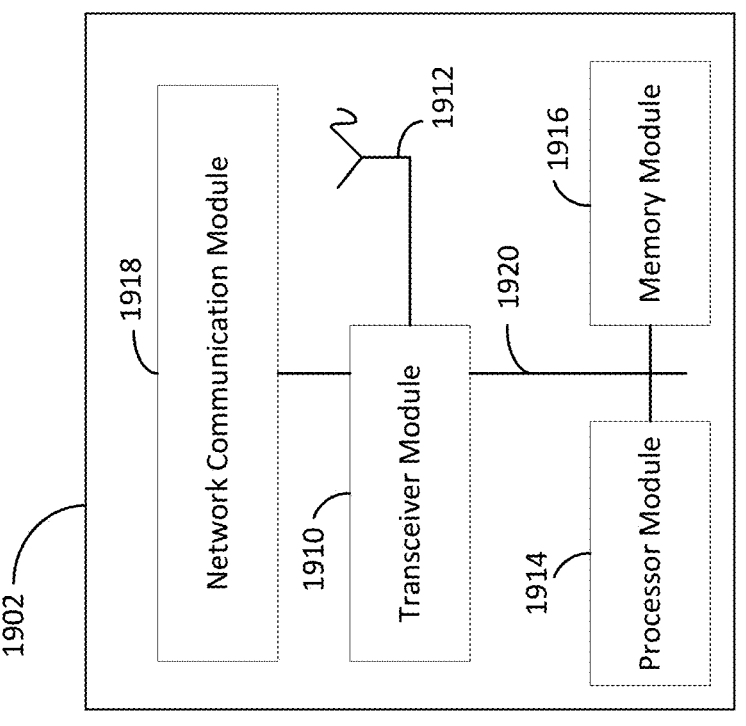
FIG. 19A illustrates a block diagram of an example base station, according to various embodiments.

FIG. 19A illustrates a block diagram of an example BS 1902, in accordance with some embodiments of the present disclosure. FIG. 19B illustrates a block diagram of an example UE 1901, in accordance with some embodiments of the present disclosure. The UE 1901 (e.g., a wireless communication device, a terminal, a mobile device, a mobile user, and so on) is an example implementation of the UEs described herein, and the BS 1902 is an example implementation of the BS described herein.

The BS 1902 and the UE 1901 can include components and elements configured to support known or conventional operating features that need not be described in detail herein. In one illustrative embodiment, the BS 1902 and the UE 1901 can be used to communicate (e.g., transmit and receive) data symbols in a wireless communication environment, as described above. For instance, the BS 1902 can be a BS (e.g., gNB, eNB, and so on), a server, a node, or any suitable computing device used to implement various network functions.

The BS 1902 includes a transceiver module 1910, an antenna 1912, a processor module 1914, a memory module 1916, and a network communication module 1918. The module 1910, 1912, 1914, 1916, and 1918 are operatively coupled to and interconnected with one another via a data communication bus 1920. The UE 1901 includes a UE transceiver module 1930, a UE antenna 1932, a UE memory module 1934, and a UE processor module 1936. The modules 1930, 1932, 1934, and 1936 are operatively coupled to and interconnected with one another via a data communication bus 1940. The BS 1902 communicates with the UE 1901 or another BS via a communication channel, which can be any wireless channel or other medium suitable for transmission of data as described herein.

As would be understood by persons of ordinary skill in the art, the BS 1902 and the UE 1901 can further include any number of modules other than the modules shown in FIGS. 19A and 19B. The various illustrative blocks, modules, circuits, and processing logic described in connection with the embodiments disclosed herein can be implemented in hardware, computer-readable software, firmware, or any practical combination thereof. To illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. The embodiments described herein can be implemented in a suitable manner for each particular application, but any implementation decisions should not be interpreted as limiting the scope of the present disclosure.

In accordance with some embodiments, the UE transceiver 1930 includes a radio frequency (RF) transmitter and a RF receiver each including circuitry that is coupled to the antenna 1932. A duplex switch (not shown) may alternatively couple the RF transmitter or receiver to the antenna in time duplex fashion. Similarly, in accordance with some embodiments, the transceiver 1910 includes an RF transmitter and a RF receiver each having circuitry that is coupled to the antenna 1912 or the antenna of another BS. A duplex switch may alternatively couple the RF transmitter or receiver to the antenna 1912 in time duplex fashion. The operations of the two-transceiver modules 1910 and 1930 can be coordinated in time such that the receiver circuitry is coupled to the antenna 1932 for reception of transmissions over a wireless transmission link at the same time that the transmitter is coupled to the antenna 1912. In some embodiments, there is close time synchronization with a minimal guard time between changes in duplex direction.

The UE transceiver 1930 and the transceiver 1910 are configured to communicate via the wireless data communication link, and cooperate with a suitably configured RF antenna arrangement 1912/1932 that can support a particular wireless communication protocol and modulation scheme. In some illustrative embodiments, the UE transceiver 1930 and the transceiver 1910 are configured to support industry standards such as the Long Term Evolution (LTE) and emerging 5G standards, and the like. It is understood, however, that the present disclosure is not necessarily limited in application to a particular standard and associated protocols. Rather, the UE transceiver 1930 and the BS transceiver 1910 may be configured to support alternate, or additional, wireless data communication protocols, including future standards or variations thereof.

The transceiver 1910 and the transceiver of another BS (such as but not limited to, the transceiver 1910) are configured to communicate via a wireless data communication link, and cooperate with a suitably configured RF antenna arrangement that can support a particular wireless communication protocol and modulation scheme. In some illustrative embodiments, the transceiver 1910 and the transceiver of another BS are configured to support industry standards such as the LTE and emerging 5G standards, and the like. It is understood, however, that the present disclosure is not necessarily limited in application to a particular standard and associated protocols. Rather, the transceiver 1910 and the transceiver of another BS may be configured to support alternate, or additional, wireless data communication protocols, including future standards or variations thereof.

In accordance with various embodiments, the BS 1902 may be a BS such as but not limited to, an eNB, a serving eNB, a target eNB, a femto station, or a pico station, for example. The BS 1902 can be an RN, a DeNB, or a gNB. In some embodiments, the UE 1901 may be embodied in various types of user devices such as a mobile phone, a smart phone, a personal digital assistant (PDA), tablet, laptop computer, wearable computing device, etc. The processor modules 1914 and 1936 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the method or algorithm disclosed herein can be embodied directly in hardware, in firmware, in a software module executed by processor modules 1914 and 1936, respectively, or in any practical combination thereof. The memory modules 1916 and 1934 may be realized as RAM memory, flash memory, ROM memory, EPROM memory, EEPROM memory, registers, a hard disk, a removable disk, a CD-ROM, or any other form of storage medium known in the art. In this regard, memory modules 1916 and 1934 may be coupled to the processor modules 1914 and 1936, respectively, such that the processors modules 1914 and 1936 can read information from, and write information to, memory modules 1916 and 1934, respectively. The memory modules 1916 and 1934 may also be integrated into their respective processor modules 1914 and 1936. In some embodiments, the memory modules 1916 and 1934 may each include a cache memory for storing temporary variables or other intermediate information during execution of instructions to be executed by processor modules 1914 and 1936, respectively. Memory modules 1916 and 1934 may also each include non-volatile memory for storing instructions to be executed by the processor modules 1914 and 1936, respectively.

The network communication module 1918 generally represents the hardware, software, firmware, processing logic, and/or other components of the BS 1902 that enable bidirectional communication between the transceiver 1910 and other network components and communication nodes in communication with the BS 1902. For example, the network communication module 1918 may be configured to support internet or WiMAX traffic. In a deployment, without limitation, the network communication module 1918 provides an 502.3 Ethernet interface such that the transceiver 1910 can communicate with a conventional Ethernet based computer network. In this manner, the network communication module 1918 may include a physical interface for connection to the computer network (e.g., Mobile Switching Center (MSC)). In some embodiments, the network communication module 1918 includes a fiber transport connection configured to connect the BS 1902 to a core network. The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method, comprising:
receiving, by a wireless communication device, a scheduling grant that comprises a first indicator in a first field of the scheduling grant and a second indicator in a second field of the scheduling grant, the scheduling grant scheduling a plurality of uplink data transmission instances, the first indicator comprising a sounding reference signal (SRS) resource index (SRI), and the second indicator comprising a transmit power control (TPC) command; and
transmitting, by the wireless communication device, the plurality of uplink data transmission instances that correspond to at least one of a first resource set or a second resource set based on the first indicator and the second indicator.

2. The method of claim 1, wherein the second indicator comprises:
a first value indicating that the plurality of uplink data transmission instances correspond to at least one of: the first resource set, a first transmission power control (TPC) command, or a first open-loop power control (OLPC) parameter set,
a second value indicating that the plurality of uplink data transmission instances correspond to at least one of: the second resource set, a second TPC command, or a second OLPC parameter set, or
at least a third value indicating that a second set of the plurality of uplink data transmission instances correspond to at least one of: the second resource set, the second TPC command, or the second OLPC parameter set.

3. The method of claim 2, further comprising:
determining, by the wireless communication device, that the second indicator is equal to the first value, wherein at least a value of the first indicator indicates one or more resources in the first resource set for transmitting the plurality of uplink data transmission instances; or
determining, by the wireless communication device, that the second indicator is equal to the second value, wherein at least a value of the first indicator indicates one or more resources in the second resource set for transmitting the plurality of uplink data transmission instances.

4. The method of claim 2, further comprising:
determining, by the wireless communication device, that the second indicator is equal to the third value, wherein at least a value of the second indicator indicates one or more resources in the second resource set for transmitting the second set of the plurality of uplink data transmission instances; and
transmitting a first set of the plurality of uplink data transmission instances corresponding to at least one of: the first resource set, the first TPC command, or the first OLPC parameter set, wherein at least a value of the first indicator indicates one or more resources in the first resource set for transmitting the first set of the plurality of uplink data transmission instances.

5. The method of claim 2, wherein the first value is a second greatest value of the second indicator, and the second value is a greatest value of the second indicator; or
wherein the first value is a greatest value of the second indicator, and the second value is a second greatest value of the second indicator.

6. The method of claim 1,
wherein the first indicator comprises a first value indicating that the plurality of uplink data transmission instances correspond to at least one of: the second resource set, a second TPC command, or a second OLPC parameter set,
wherein the second indicator comprises a second value indicating that the plurality of uplink data transmission instances correspond to at least one of: the first resource set, a first TPC command, or a first OLPC parameter set, and
wherein the first or second indicator comprises at least a third value indicating that a first set of the plurality of uplink data transmission instances correspond to at least one of: the first resource set, the first TPC command, or the first OLPC parameter set, and a second set of the plurality of uplink data transmission instances correspond to at least one of: the second resource set, the second TPC command, or the second OLPC parameter set.

7. The method of claim 6, wherein the first value is a greatest value of the first indicator; or
wherein the second value is a greatest value of the second indicator.

8. The method of claim 1, wherein each of the first and second resource sets includes a sounding reference signal (SRS) resource set; or
wherein the scheduling grant can be received with at least one of: Downlink Control Information (DCI) format, a configured grant, or a dynamically configured grant; or
wherein each of the uplink data transmission instances includes a non-codebook based Physical Uplink Shared Channel (PUSCH) transmission.

9. The method of claim 1, wherein the plurality of uplink data transmission instances include a first uplink data transmission instance set and a second uplink data transmission instance set.

10. The method of claim 9, wherein the first and second uplink data transmission instance sets respectively correspond to at least one of:
a first resource set and a second resource set;
a first transmission occasion and a second transmission occasion of a same transport block;
a first frequency hop and a second frequency hop;
a first half of a plurality of PUSCH transmissions and a second half of the plurality of PUSCH transmissions;
a plurality of PUSCH transmissions arranged in an odd order and the plurality of PUSCH transmissions arranged in an even order; or
odd pairs of a plurality of PUSCH transmissions and even pairs of the plurality of PUSCH transmissions.

11. The method of claim 1, wherein:
the first indicator indicates at least one of: a first resource set, a first TPC command, or a first OLPC parameter set, or
the second indicator indicates at least one of: a resource set, a second TPC command, or a second OLPC parameter set.

12. A wireless communication method, comprising:

transmitting, by a wireless communication node, a scheduling grant that comprises a first indicator in a first field of the scheduling grant and a second indicator in a second field of the scheduling grant, the scheduling grant scheduling a plurality of uplink data transmission instances, the first indicator comprising a sounding reference signal (SRS) resource index (SRI), and the second indicator comprising a transmit power control (TPC) command; and receiving, by the wireless communication node, the plurality of uplink data transmission instances that correspond to at least one of a first resource set or a second resource set based on the first indicator and the second indicator.

13. A wireless communication device, comprising:

at least one processor configured to:

receive, via a transceiver, a scheduling grant that comprises a first indicator in a first field of the scheduling grant and a second indicator in a second field of the scheduling grant, the scheduling grant scheduling a plurality of uplink data transmission instances, the first indicator comprising a sounding reference signal (SRS) resource index (SRI), and the second indicator comprising a transmit power control (TPC) command; and transmit, via the transceiver, the plurality of uplink data transmission instances that correspond to at least one of a first resource set or a second resource set based on the first indicator and the second indicator.

14. A wireless communication node, comprising:

at least one processor configured to:

transmit, via a transceiver, a scheduling grant that comprises a first indicator in a first field of the scheduling grant and a second indicator in a second field of the scheduling grant, the scheduling grant scheduling a plurality of data transmission instances, the first indicator comprising a sounding reference signal (SRS) resource index (SRI), and the second indicator comprising a transmit power control (TPC) command; and receive, via the transceiver, the plurality of uplink data transmission instances that correspond to at least one of a first resource set or a second resource set based on the first indicator and the second indicator.

15. The wireless communication node of claim 14, wherein the second indicator comprises:

a first value indicating that the plurality of uplink data transmission instances correspond to at least one of: the first resource set, a first transmission power control (TPC) command, or a first open-loop power control (OLPC) parameter set, a second value indicating that the plurality of uplink data transmission instances correspond to at least one of: the second resource set, a second TPC command, or a second OLPC parameter set, or at least a third value indicating that a second set of the plurality of uplink data transmission instances correspond to at least one of: the second resource set, the second TPC command, or the second OLPC parameter set.

* * * * *